United States Patent [19]

Troupes et al.

[11] Patent Number: 4,712,102
[45] Date of Patent: Dec. 8, 1987

[54] METHOD AND APPARATUS FOR DISPLAYING ENLARGED OR ENHANCED DOT MATRIX CHARACTERS

[75] Inventors: Demetrios Troupes; Randall W. Alexander, both of Charlotte, N.C.

[73] Assignee: International Business Machines Corporation, Armonk, N.Y.

[21] Appl. No.: 752,176

[22] Filed: Jul. 3, 1985

Related U.S. Application Data

[63] Continuation-in-part of Ser. No. 695,997, Jan. 29, 1985, Pat. No. 4,586,835, which is a continuation-in-part of Ser. No. 602,248, Apr. 20, 1984, abandoned.

[51] Int. Cl.$^4$ .............................................. G09G 3/00
[52] U.S. Cl. ................................... 340/790; 340/728; 340/731; 340/735
[58] Field of Search ............... 340/731, 735, 790, 728; 400/121, 124; 101/93.04, 93.05

[56] References Cited

U.S. PATENT DOCUMENTS

| | | | |
|---|---|---|---|
| 3,182,308 | 5/1965 | Dutton et al. | 343/5 |
| 3,546,681 | 12/1970 | Korn et al. | |
| 3,588,872 | 6/1971 | Kolb et al. | |
| 3,868,673 | 2/1975 | Mau, Jr. et al. | 340/723 |
| 3,903,517 | 9/1975 | Hafner | 340/723 |
| 3,911,420 | 10/1975 | Lampson | |
| 4,079,367 | 3/1978 | Yonezawa et al. | |
| 4,081,799 | 3/1978 | Granberg et al. | |
| 4,090,188 | 5/1978 | Suga | |
| 4,107,662 | 8/1978 | Endo et al. | |
| 4,129,860 | 12/1978 | Yonezawa et al. | |
| 4,242,678 | 12/1980 | Somerville | 340/721 |
| 4,290,064 | 9/1981 | Traster | 340/723 |
| 4,358,788 | 11/1982 | Burrowes | 340/723 |
| 4,367,533 | 1/1983 | Weiner | 364/519 |
| 4,428,284 | 1/1984 | Thorne | 400/121 |
| 4,462,705 | 7/1984 | Hayashi et al. | 400/121 |
| 4,508,463 | 4/1985 | Wang et al. | 400/121 |
| 4,517,560 | 5/1985 | Murayama et al. | 340/735 |
| 4,555,701 | 11/1985 | Dahl et al. | 340/728 |

FOREIGN PATENT DOCUMENTS 2213953 4/1978 Fed. Rep. of Germany.

Primary Examiner—Gerald L. Brigance
Assistant Examiner—Jeffery A. Brier
Attorney, Agent, or Firm—Bell, Seltzer, Park & Gibson

[57] ABSTRACT

A method and apparatus for displaying enlarged or enhanced dot matrix characters is disclosed. Using stored sets of binary data elements which define the shape of the respective characters of a set, logical operations are performed to add additional binary data elements to provide the desired enlarged character. Characters may be enlarged in the vertical and horizontal directions by lengthening the horizontal, vertical, and diagonal linear components which together comprise the character. Characters may also be enhanced by thickening the linear components thereof in a direction orthogonal to that of the linear components, and made more dense with additional dots along the length of the linear components. The stored data defines the character with a high density in the horizontal direction and a lower density in the vertical and diagonal directions. The characters are enlarged, and enhanced, by defining a reference matrix which comprises a subset of the stored binary data elements, expanding the reference matrix by adding blank binary data elements to the defined reference matrix at locations between the stored binary data elements, and comparing portions of the expanded reference matrix with corresponding portions of a predetermined matrix, and converting to a dot those added binary data elements that match the elements of the predetermined matrix. Characters may be differentially enlarged, or enhanced in one manner but not another, or they may be thickened toward the middle of each character.

58 Claims, 25 Drawing Figures

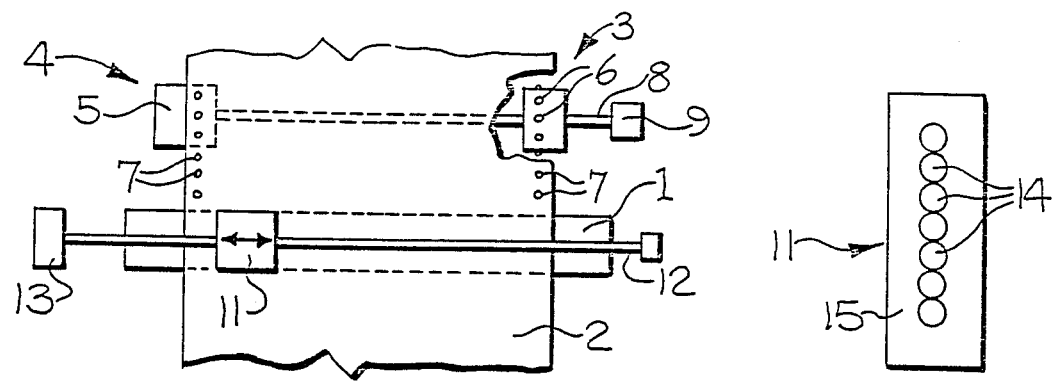
_Fig-1_
_Fig-2_
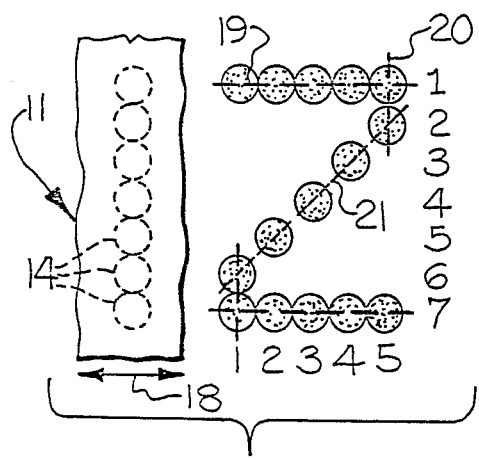
_Fig-3_
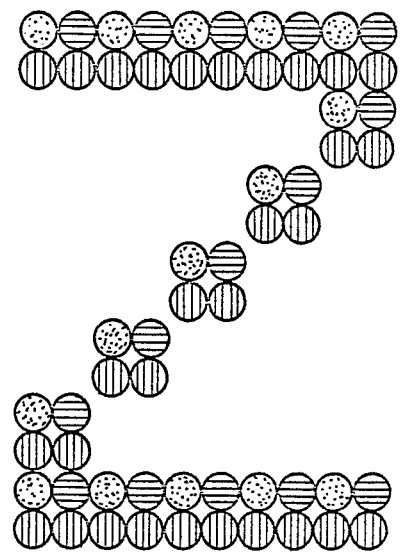
_Fig-4_
PRIOR ART

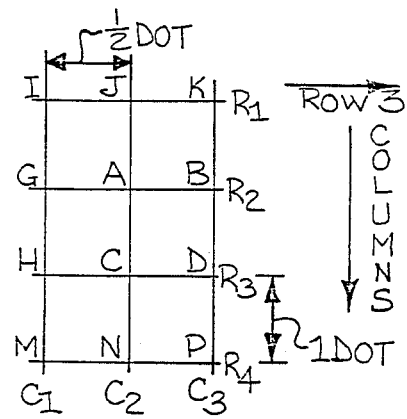
FIG-9
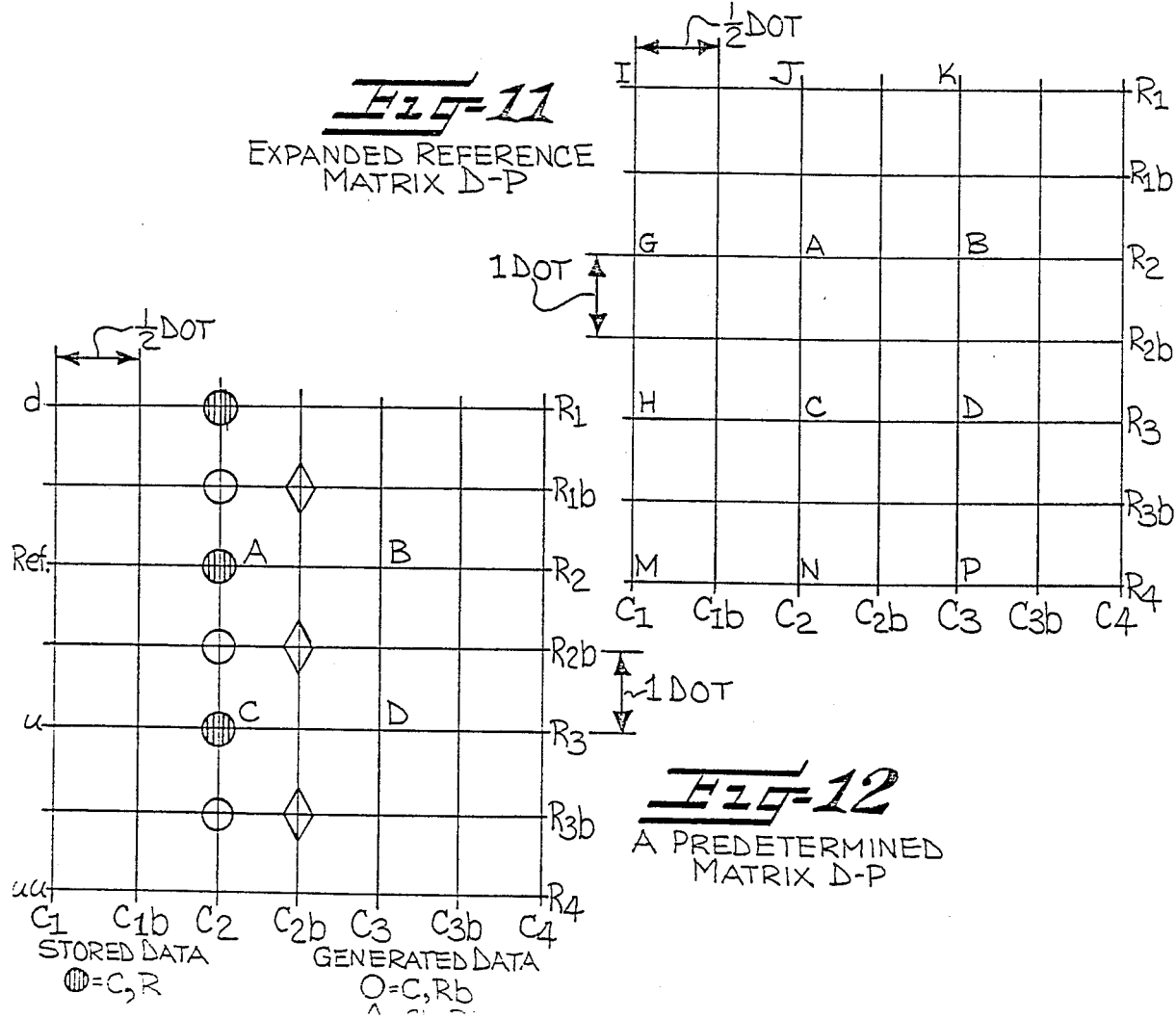
FIG-10 REFERENCE MATRIX-DP
FIG-11 EXPANDED REFERENCE MATRIX D-P
FIG-12 A PREDETERMINED MATRIX D-P

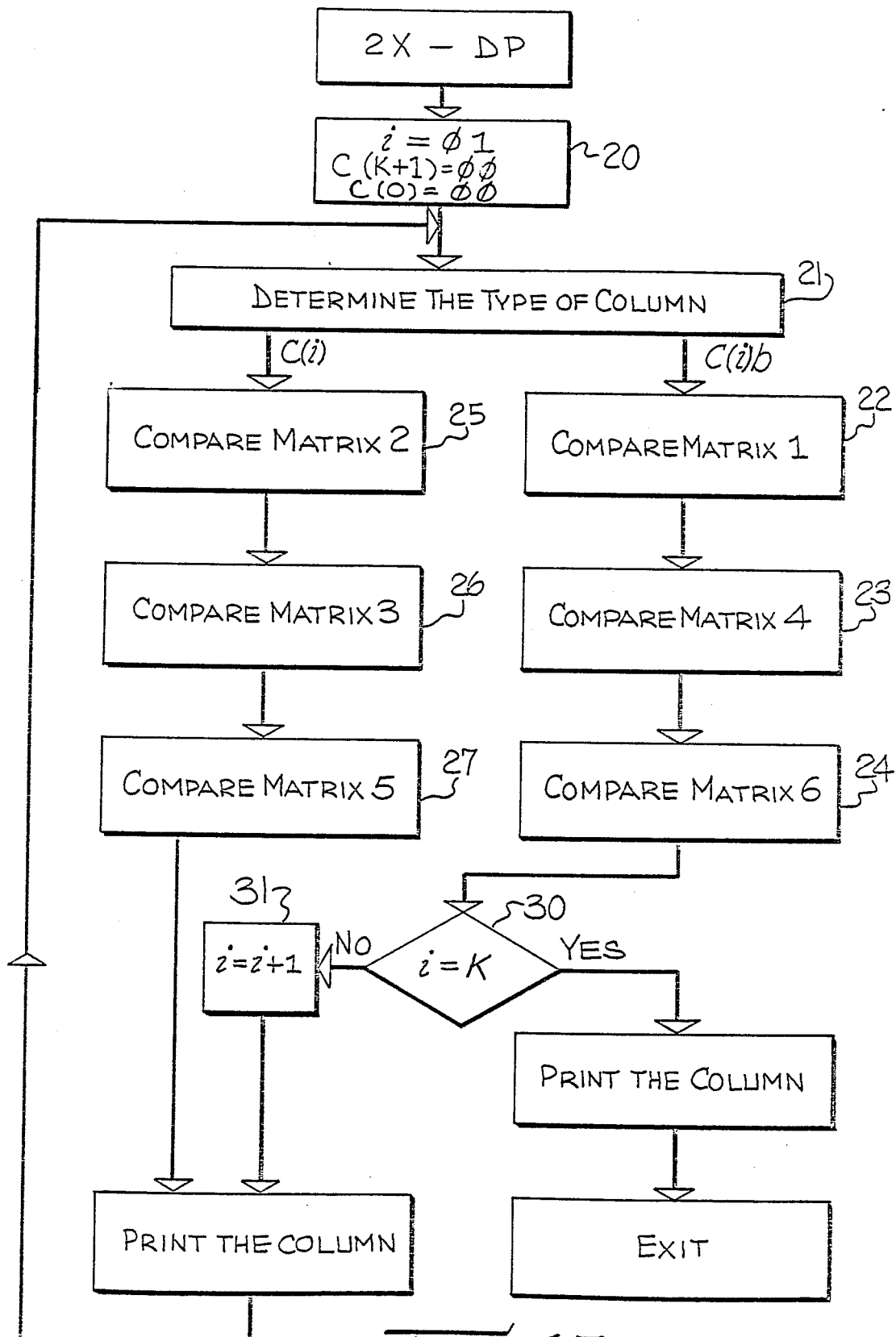

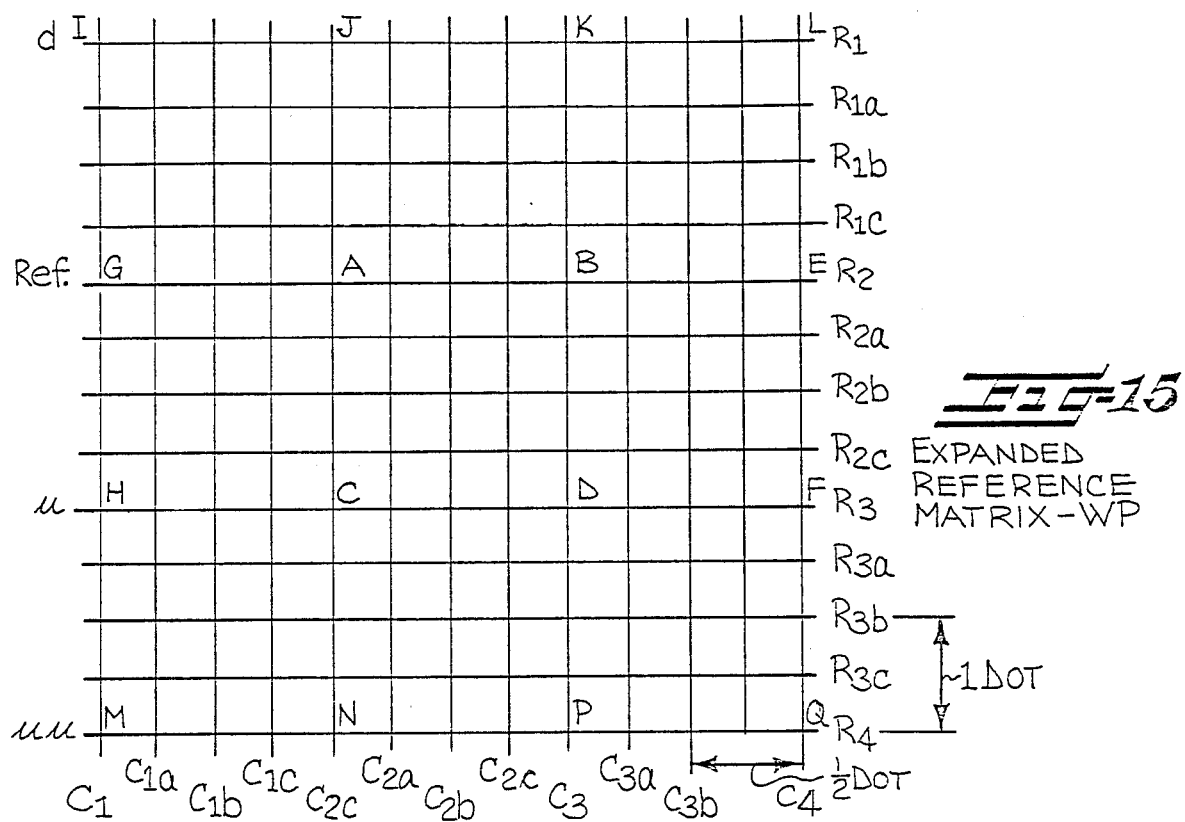
FIG-15 EXPANDED REFERENCE MATRIX-WP
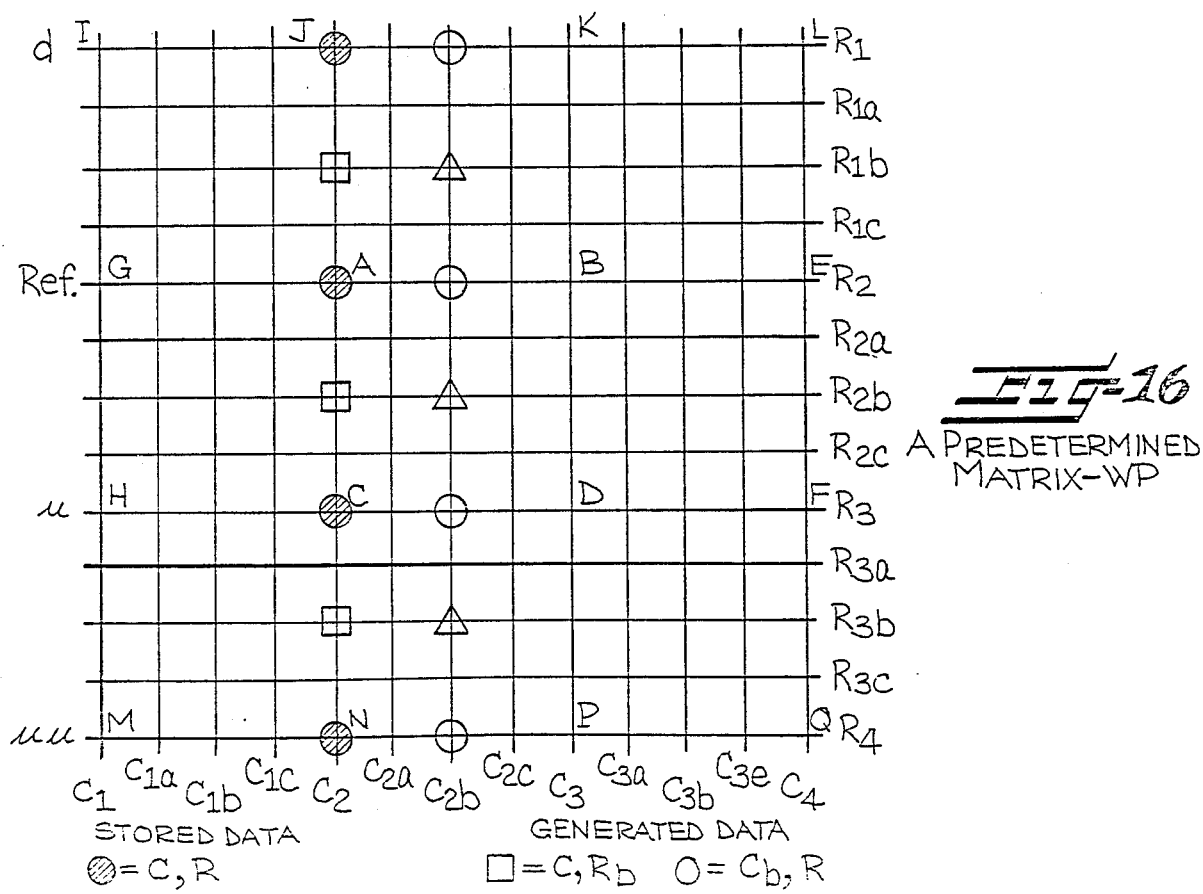
FIG-16 A PREDETERMINED MATRIX-WP
STORED DATA ⊚ = C, R
GENERATED DATA □ = C, $R_b$   ○ = $C_b$, R

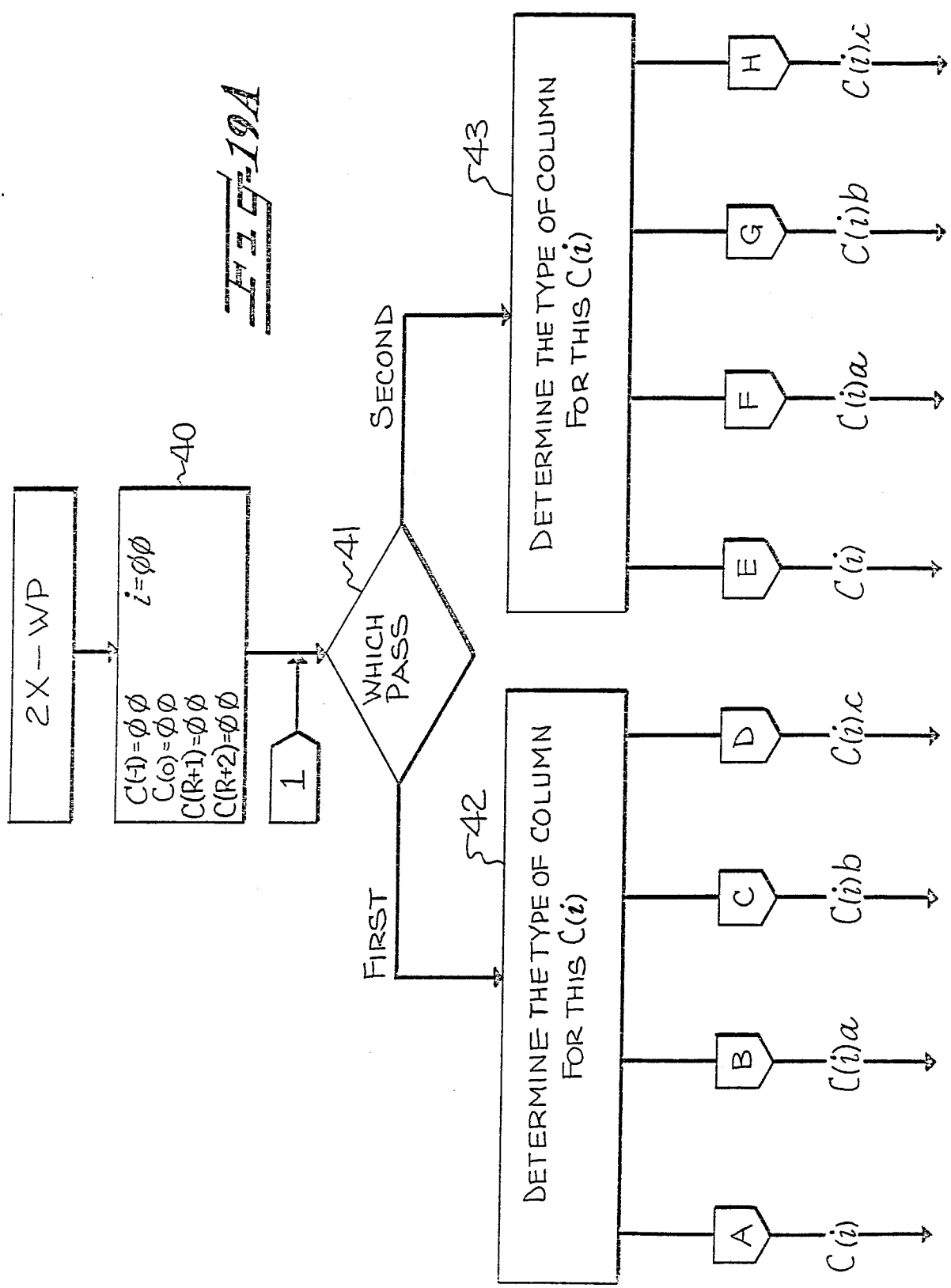

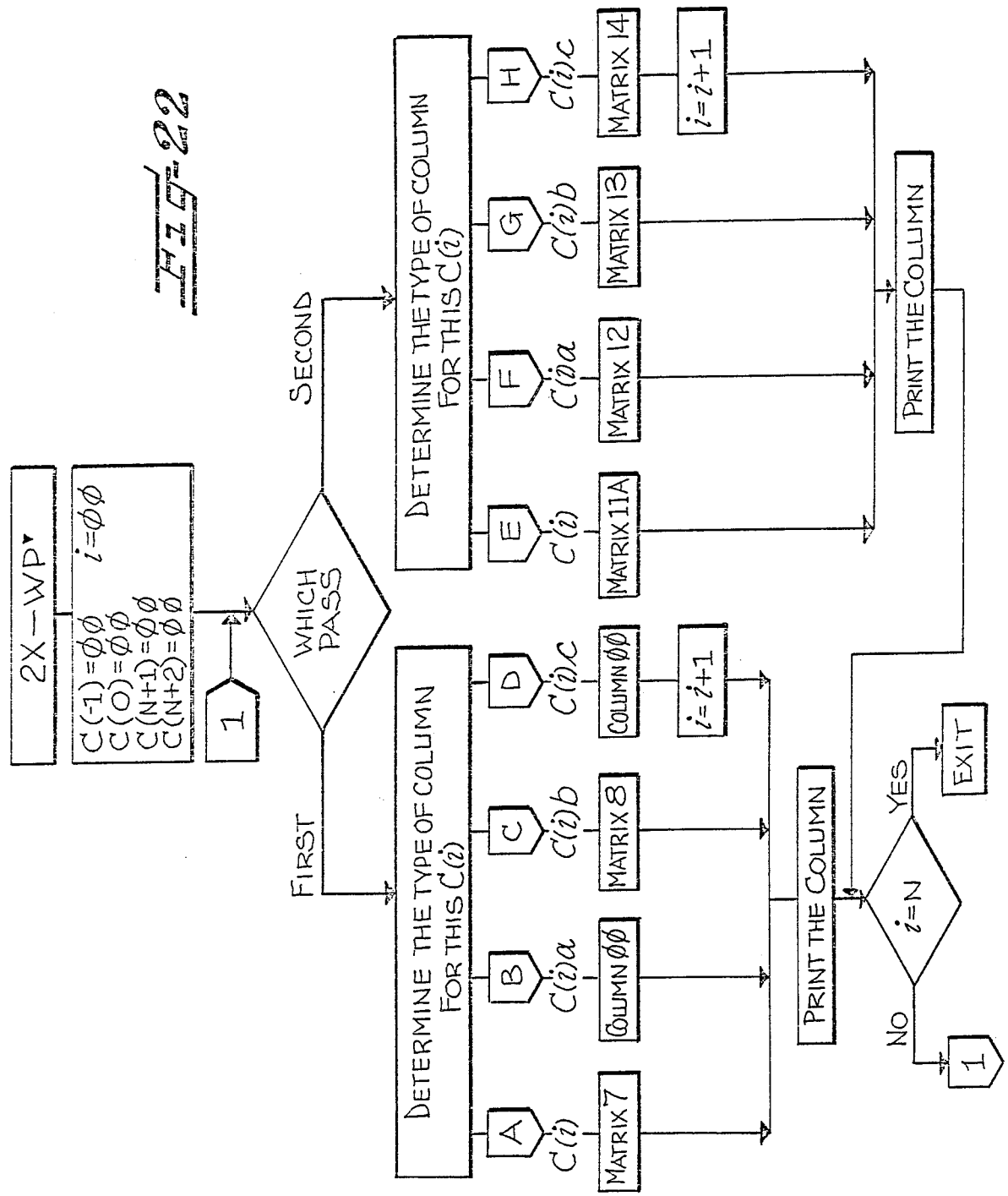

METHOD AND APPARATUS FOR DISPLAYING ENLARGED OR ENHANCED DOT MATRIX CHARACTERS

BACKGROUND OF THE INVENTION

This application is a continuation-in-part of application Ser. No. 695,997, filed Jan. 29, 1985, now U.S. Pat. No. 4,586,835, which is a continuation-in-part of application Ser. No. 602,248, filed Apr. 20, 1984, now abandoned. This application is related to application Ser. No. 752,165, filed concurrently herewith. The contents of these applications are incorporated herein by reference.

FIELD OF THE INVENTION

The present invention relates to a method and apparatus for displaying dot matrix characters that may be selectively enlarged or enhanced. The characters are enlarged from stored sets of binary data elements representing either a dot or a blank, and logical operations are performed on the stored data elements to selectively enlarge the character, and selectively enhance it as desired by independently increasing the density or thickening the width of the linear components making up the character.

In dot matrix printers, each character is comprised of a matrix of dots and blanks which together define the character. On close examination, the dots are arranged in a matrix of positions that are typically arranged in horizontal rows and vertical columns that are adjacent, parallel, and evenly spaced. The intersections of the rows and columns determine the locations of the dots and blanks, and the dots may overlap, depending upon the spacing between matrix intersections and dot diameter. Each dot or blank is represented in the apparatus by a binary data element with a binary 1 typically representing a dot and a binary 0 representing a blank. Data representing at least one entire character set is usually stored in the apparatus, and it includes numerals, upper and lower case letters, punctuation, and other commonly used symbols.

Depending upon the type of apparatus displaying the character, the quality and size of the character and the speed of printing may usually be selected as desired, within the capabilities of the display and associated data processing apparatus or computer. Each type of display, such as a dot matrix printer, electrostatic printer, ink jet printer, cathode-ray tube, etc., has unique physical constraints imposed by its mechanical or electrical capabilities. This usually affects the dot-to-dot spacing between locations in the matrix, as well as the speed at which the dots may be displayed. The associated data processing apparatus typically stores the sets of binary data elements defining the shape of the respective characters, performs any necessary logical operations on the stored data to provide the desired size, density or thickness of the displayed character, and governs the physical operations of the printer (or display).

It is desirable for a dot matrix printer to print characters in more than one size, and it may also be desirable to print characters in more than one density and thickness. It is also desirable to print at a high speed to provide a high volume output, with a lower quality printed character being acceptable, and to alternatively print a higher quality character, with a lower print speed being acceptable. Printing at a high speed with a lower quality printed character is commonly performed when a large volume of output is required, as in a data processing environment. A high speed of printing may be achieved by printing only a comparatively small number of the binary data elements for each character spaced by about one dot width, resulting in the printing of characters of a lower print quality. On the other hand, high quality printed characters are preferred in a word processing environment or office environment, as well as the ability to selectively enlarge or enhance all or some of the characters. A higher quality character may be achieved by printing a relatively high number of the binary data elements for each character and spacing them by less than one dot width so that they overlap. Lower print speed and volume of output may result, but this is likely to meet the output demands of such an environment.

To print characters of different size or quality of print, it is necessary to provide data for printing in each size or quality. It is known to store a single set of binary data elements representing each character in a single size and quality, and to duplicate by rote this basic data to obtain additional binary data elements for printing an enlarged character or a character supposedly having a higher quality. This resulted in "stair-step" diagonals and seriously degraded the quality of the character and its legibility. These poor quality characters necessitated some type of smoothing operation to reduce the stair-stepping effect, but these methods and displays are usually very complex and expensive. Related problems include a destruction of the symmetry of both individual characters and groupings of characters to make words or phrases. For instance, the spacing between the linear components of a character may be degraded, and the base line for a character set may be lost, or widened to an unacceptable degree.

An alternative to simply duplicating the stored data to enlarge or enhance a single character is to store all of the binary data representing the multiplicity of sets of all enlarged characters, all improved quality characters, and all of the various combinations thereof. However, a character expanded to 2x, 4x, 8x, etc. in size requires 4x, 16x, 64x, etc. times the amount of data storage. Such increases in the amount of data storage are usually prohibitive in size and cost. And, low cost printers that employ inexpensive and relatively simple data processing components do not include the capabilities to either store additional sets of enlarged or enhanced characters, or process the complex algorithms which have been necessary in the past to enlarge a character and smooth it to maintain its legibility.

To enlarge a character using the present invention, additional binary data elements are generated from the stored data elements, and dots are printed at selected print positions in the matrix corresponding to the desired character as represented by the combination of the stored and generated data elements. The positions for the additional generated binary data elements are selected to enlarge each character by extending the horizontal, vertical and diagonal linear components that together define the character. The character may also be enhanced by increasing the density and/or thickening the width of these linear components. Specifically, overlapping dots may be selectively printed along the length of a vertical, diagonal, or horizontal linear component of the line to make it appear darker or more dense, and the lines may be selectively widened in a direction generally orthogonal to their linear direction to make them thicker. Furthermore, to accommodate a variety of combinations of different print styles and sizes, characters may be enlarged, thickened, or have their density changed in all directions, or in one or more of the horizontal, vertical, and diagonal directions, and each may be done independently of the other. Similarly, the data may be processed to enlarge in one direction and enhance in another.

The term diagonal refers to any line that is not either horizontal or vertical. Similarly, while reference is made to horizontal rows and vertical columns as a matter of convenience, the direction or designation of a line of binary data elements may be changed as necessary or desirable to suit a particular application. The invention is applicable to any data supplied, whether it represents characters, graphics, line drawings, geometrical shapes, etc., since the binary data is considered as a collection of lines.

Accordingly, it is an object of the present invention to provide a method and apparatus for displaying dot matrix characters that are selectively enlarged.

It is a further object of the present invention to provide a method and apparatus for displaying dot matrix characters that are enlarged and selectively enhanced by thickening the character components or making them more dense, or both.

It is a further object of the present invention to provide a method and apparatus for displaying dot matrix characters that minimizes the cost and amount of data storage required to produce a wide variety of characters, including characters that have been selectively enlarged or enhanced or both.

It is a further object of the present invention to provide a method and apparatus for displaying dot matrix characters of varying size with linear components of varying density and thickness from a single set of stored binary data elements representing a single character set.

It is a further object of the present invention to provide a method and apparatus for displaying enlarged or enhanced dot matrix characters where the data for generating the character to be displayed is generated from a series of logical operations performed on a single set of stored character data elements.

It is a further object of the present invention to provide a method and apparatus for displaying dot matrix characters where the character size, density, and thickness may each be individually determined for each character and individually determined for each of the horizontal, vertical, and diagonal components of each character.

It is a further object of the present invention to provide a method and apparatus for displaying dot matrix characters where the character and base line symmetry are preserved and are uniform for all charactera sizes and enhancements.

It is a further object of the present invention to provide a method and apparatus for displaying enlarged or enhanced dot matrix characters that may be implemented with inexpensive data processing equipment for data handling and printer conftrol and for minimizing the complexity and need for additional processing power and storage capabilities.

SUMMARY OF THE INVENTION

The present invention displays selectively enlarged dot matrix characters using binary data elements. Sets of binary data elements are stored, and each set defines the shape of a respective character which has a high density in the horizontal direction and a lower density in the vertical and diagonal directions. Logical operations are performed on a set of the stored binary data elements to generate additional binary data elements which enlarge the size of the character in the vertical and horizontal directions. The additional binary data elements are used together with the stored binary data elements to display characters in which the vertical, diagonal and horizontal linear components may be lengthened to enlarge the character size. The linear components may also be selectively thickened in a direction orthogonal to their linear direction and selectively made more dense along their length. Depending upon the nature of the character to be displayed, the data representing the stored character may be processed to selectively enlarge, thicken, and make more dense less than all of the vertical, horizontal, and diagonal linear components that together comprise the dot matrix character. Further, the additional binary data elements may be combined with the stored binary data elements to thicken the character by positioning the generated binary data elements to thicken the upper portion of the character downwardly and lower portion of the character upwardly, toward the central portion or middle of the character. Still further, the character may be differentially enlarged.

BRIEF DESCRIPTION OF THE DRAWINGS

The objects, features, and advantages of the invention are more fully understood by reading and understanding the following description of a preferred embodiment of the invention, with reference to the accompanying drawings.

FIG. 1 is a schematic diagram illustrating a dot matrix printer of the type that is compatible with the present invention.

FIG. 2 is a schematic diagram illustrating the impacting end of a print head for a typical 7-wire dot matrix wire printer as may be used in the printer of FIG. 1.

FIG. 3 is a schematic diagram illustrating the relative movement of the print head of FIG. 2 to print a lower quality dot matrix character of 1x size as illustrated.

FIG. 4 illustrates the character of FIG. 3 enlarged to a 2x size as was typically done in the prior art, and illustrates the severe stair-stepping associated with the prior art techniques.

FIG. 9 illustrates diagrammatically a set of stored binary data elements defining the shape of the character of FIG. 3 with the data in the vertical and diagonal directions being of a lower density and the data in the horizontal direction being of a higher density.

FIG. 10 illustrates diagrammatically a reference matrix for the 1x size to enlarge a character in the data processing or lower quality mode. The twelve matrix positions A-D, G-K, M-N, P defined by the intersections of the R rows and C columns correspond to the stored binary data elements defining the shape of a character. The horizontal rows R1-R4 are each vertically spaced by one dot width, and the vertical columns C1-C3 are each horizontally spaced by one-half dot width.

FIG. 11 illustrates diagrammatically an expansion of the reference matrix of FIG. 10 with the added rows Rb (i.e., R1b, R2b, R3b) and added columns Cb (i.e., C1b, C2b, C3b) defining locations of added binary data elements. The added binary data elements are located at the intersections of the added rows Rb with the stored columns C and added columns Cb, and the added columns Cb with the stored rows R and added rows Rb.

FIG. 12 illustrates diagrammatically a predetermined matrix to determine which of certain ones of the added binary data elements of the expanded reference matrix of FIG. 11 are to be converted to a dot for the added binary data elements at locations C, Rb and Cb, Rb.

FIG. 13 is a flow chart representing the logical operations performed in accordance with the invention to print characters that are doubled in size and of data processing quality (2x, DP) as illustrated in FIG. 6.

FIG. 15 illustrates diagrammatically an expansion of the reference matrix of FIG. 14 with the added columns Ca, Cb, Cc and added rows Ra, Rb, and Rc defining locations of added binary data elements.

FIG. 16 illustrates diagrammatically the expanded reference matrix of FIG. 15 with certain of the locations A-N, P-Q being selectively used to define a predetermined matrix to determine which, if any, of the added binary data elements are to be converted to a dot for the added binary data elements at locations C, Rb; Cb, R; and Cb, Rb.

FIGS. 19A and 19B are a flow chart representing the logical operations performed in accordance with the invention to print characters doubled in size and enhanced to word processing quality (2x, WP), as illustrated in FIG. 5.

FIG. 22 is a flow chart representing the logical operations performed in accordance with the invention to print characters enlarged to the 2x size with the linear components thereof made more dense but not thickened, as in FIG. 8.

DESCRIPTION OF THE INVENTION

Figure 24:
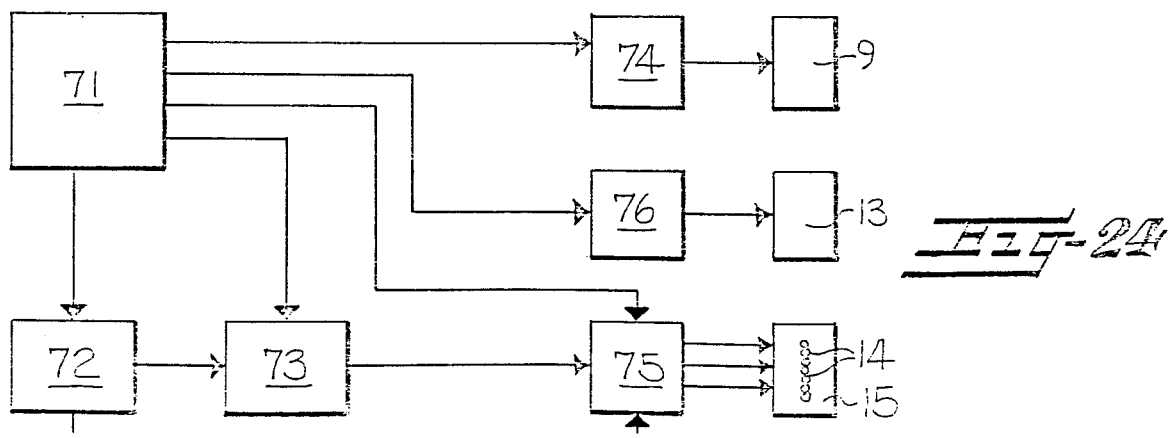
FIG. 24 is a block diagram illustrating the components of a printing apparatus for displaying characters in accordance with the present invention.

The invention is described as applied to a printer of the type illustrated diagrammatically in FIG. 1, although it is to be understood that the invention is compatible with other dot matrix display devices, such as those identified earlier. A dot matrix printer typically includes a platen 1 over which a print medium 2 is moved by means of two tractor devices 3, 4. The print medium may be, for example, a continuous web of paper having holes 7 parallel to the edges thereof. Each tractor device includes a wheel or belt 5 provided with protruding pins 6 on the outer surface. The pins 6 engage the holes 7 formed in the web to provide a positive drive. The two tractor wheels 5 are mounted on a common shaft 8 which may be rotated as required by a motor 9 to advance the medium over the platen. The motor 9 is typically controlled by a print medium control, as illustrated in FIG. 24.

The printer includes a traversing print head 11 which is mounted on a support 12 extending over the platen 1 so that the medium 2 passes between the platen and the print head 11. The print head 11 can be moved along support 12 by motor 13 by way of a belt or rotating threaded shaft. The combined movement of the paper and the movement of the print head allows the print head to reach most any point on the surface of the medium 2.

The impacting portion of the print head 11, as illustrated in FIG. 2, is formed in part with a column of seven printing elements 14 arranged in a 1 by 7 vertically oriented matrix and supported in a body portion 15. The elements 14 are typically wires which can be selectively moved axially by, for example, an electromagnet. Each wire is individually linked to an electromagnet so that it may be individually fired as necessary or desirable in timed relation with the movement of the print head 11. The print wires press an inked ribbon onto the medium 2 to perform the printing operation. As the print head 11 traverses the width of the paper along the length of the support 12, the data defining the characters is provided to the electromagnets controlling the print wires in a coordinated, time sequence to fire them as the print head passes through the columns defining the character.

The dotted lines 19-21 in FIG. 3 help illustrate, respectively, the horizontal, vertical and diagonal linear components of the character. All characters may be defined by such components, with the diagonal component being any linear component that is not horizontal or vertical. These component lines are not displayed when the character is printed. For the purposes of this application, a full diagonal line is one that falls midway between a horizontal line and a vertical line, i.e. at about a 45° angle. A half diagonal line is one that falls midway between a full diagonal line and either a horizontal line or a vertical line, i.e. at about 22½° displaced from either the horizontal line or the vertical line. Depending upon the size and number of data elements in the matrix, the exact angular displacements may vary.

Referring still to FIG. 3, as the print head moves laterally, as shown by arrow 18, individual wires in the print head are fired at appropriate times to print dots that define the adjacent vertical columns of the character. As the print head 11 moves from left to right the elements 14 are selectively operated to print the complete left vertical feature of the character first, then to print the succeeding vertical features column by column, and finally to print the last right vertical feature as the print head moves across the print medium. The size and position of the character and the distance between adjacent dots in the horizontal direction is controlled by varying the speed of movement of the head in relation to the timing of the operation of the printing elements. The spacing of the dots in the vertical direction corresponds to the spacing of the printing elements 14. Specifically, as the print head 11 reaches the location of column 1 for the letter Z as illustrated in FIG. 3, print wires 1, 6, and 7 are advanced to strike the ribbon against the print medium, printing the three dots for column 1, and are then retracted. As the print head approaches column 2, print wires 1, 5, and 7 are advanced, and this pattern continues as the print head moves through the columns 1 through 5 to print the entire character in 1x size as illustrated.

In a practical embodiment of the invention, each of the printing elements 14 in the print head 11 prints a circular dot which has a diameter of about 1/60 inch, and the spacing between the centers of adjacent elements is substantially equal to the diameter of each dot so that, in the vertical direction, adjacent printed dots will just touch. To print a character of 1x size of a lower quality at a high speed, the speed of movement of the print head 11 across the print medium 2 and the frequency of operation of the printing elements 14 are coordinated so that adjacent columns of dots in the horizontal direction have a spacing of 1/16 inch between centers. Such a character is illustrated in FIG. 3 and is referred to as a 1x-DP character, meaning 1x size, data processing quality.

FIG. 4 illustrates the character of FIG. 3 enlarged to a 2x size as was typically done in the prior art by duplicating each of the originally stored dots to the right, down, and down-right. While this enlarges the character satisfactorily in the horizontal and vertical directions, it produces undesirable stair-stepping on diagonals which distorts the character and degrades its legibility. The problem is aggravated by enlargements above 2x. Some smoothing operations have been used in the past to reduce the stair-stepping effect, but they require complex algorithms, additional data processing and data storage capabilities, and are typically very time consuming.

Figure 5:
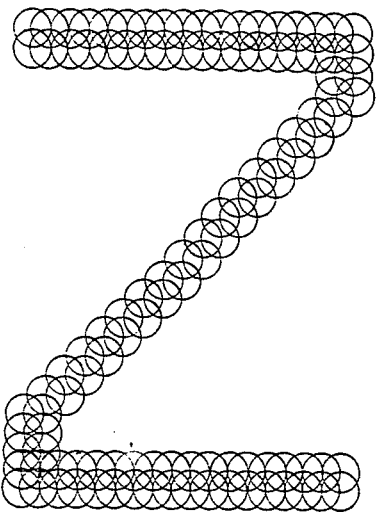
FIG. 5 illustrates the character of FIG. 3 enlarged to the 2x size according to the present invention with the linear components thereof enhanced by being made more dense and thickened.
Figure 6:
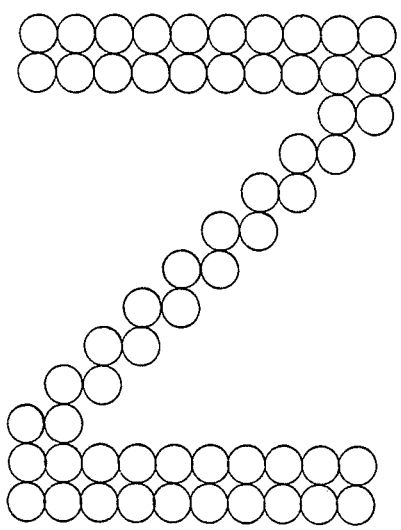
FIG. 6 illustrates the character of FIG. 3 enlarged to the 2x size according to the present invention with the linear components thereof thickened but not made more dense.
Figure 7:
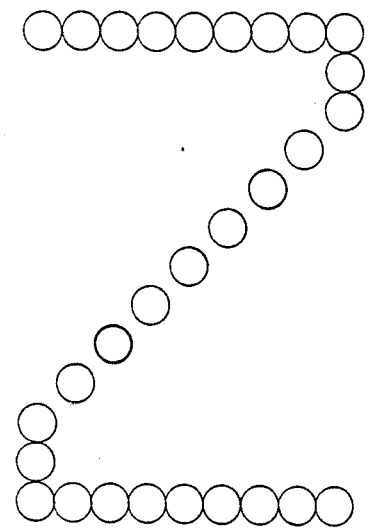
FIG. 7 illustrates the character of FIG. 3 enlarged to the 2x size accordaing to the present invention with the linear components thereof neither thickened nor made more dense.
Figure 8:
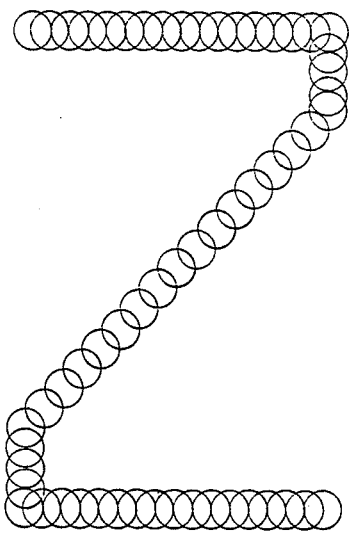
FIG. 8 illustrates the character of FIG. 3 enlarged to the 2x size according to the present invention with the linear components thereof made more dense but not thickened.

FIG. 5 illustrates the character of FIG. 3 enlarged to the 2x size according to the present invention with the linear components thereof enhanced by being made more dense and thickened. FIG. 6 illustrates the character of FIG. 3 enlarged to the 2x size according to the present invention with the linear components thereof thickened but not made more dense. FIG. 7 illustrates the character of FIG. 3 enlarged to the 2x size according the present invention with the linear components thereof neither thickened nor made more dense. FIG. 8 illustrates the character of FIG. 3 enlarged to the 2x size according to the present invention with the linear components thereof made more dense but not thickened. Each of the characters in FIGS. 5-8 illustrate some of the possible combinations of enlargement and enhancement that are possible with the present invention, and they are discussed in more detail herein.

While a specific embodiment of the invention is described in connection with a seven wire print head for printing a typical 5 by 7 character, it is to be understood that different print heads and characters are compatable with the invention. And, depending upon the physical limitations of each printer as to size and speed, it may be necessary for the print head to make multiple passes, or move at lower translational speeds, to print an enlarged character or an enhanced character.

To print characters, it is necessary to store or have otherwise available sets of binary data elements, with each set defining the shape of a respective character. The binary data elements are processed as necessary to print the dots defining the character. FIG. 9 illustrates the logical ones and logical zeros stored in storage device 16 that represent the binary data elements defining the shape of the letter Z. There are nine vertical columns and seven horizontal rows defining each character, and each is defined with a high density in the horizontal direction and a lower density in the vertical and diagonal directions. The data from the storage device 16 is read out column-by-column, processed as necessary, and the processed data from each column is used to sequentially control the column of printing elements 14 in the print head 11 as it moves across the printing medium. When a binary 1 is stored in a data storage location, the corresponding printing element is operated to imprint a dot on the printing medium, and when a binary 0 is stored the printing element is not operated. To print the 1x data processing quality character shown in FIG. 3, which has a lower print density in the horizontal, vertical, and diagonal directions, the data elements in vertical columns 2, 4, 6, and 8 of the storage device 16 are not used. Thus, the data in the columns designated by an asterisk at the top are deleted and only the remaining columns are used to print the character.

Each stored set of binary data elements represents linear components that define the respective character. Specifically, the character is made up of horizontal, vertical, and diagonal components, as reflected by FIGS. 3-6. According to the present invention, each character is enlarged by increasing the length of the linear components that extend in each of the various directions. In addition to being enlarged, a character may also be thickened by increasing the width of a linear component in a direction generally orthogonal to its length. Compare, for instance, the thickened characters of FIGS. 5 and 6 to the non-thickened characters of FIGS. 7 and 8. Still further, in addition to being enlarged, the density of the linear components may also be increased to darken the appearance of the character. Compare, for instance, the increased density of the linear components of the characters of FIGS. 5 and 8 with the density of the characters of FIGS. 6 and 7.

A. Character Enlargement In The Data Processing Mode

When processing data to enlarge a character in the lower quality or data processing mode, such as printing the 2x character of FIG. 6, the print head must make two passes. During the first pass, the upper portion of the character is printed. The paper is then advanced by a distance equal to the height of the column of the dots of the print head and then the second pass is printed to create the bottom portion of the character. The print head may move across the print medium at full speed because no overlapping dots are printed to enhance the character by increasing its density or thickening the linear components.

It is also necessary to perform logical operations on a set of the stored binary data elements from the storage device 16 to generate the additional binary data elements which enlarge the size of the respective character both vertically and horizontally, and to convert selected ones of the added binary data elements to a dot. (Similar logical operations selectively enhance the respective character as necessary or desirable by thickening it and defining it more densely, as described in the next section.) The additional binary data elements are then combined with the stored binary data elements to display the characters in their enlarged size. In performing the logical operations to generate the additional binary data elements, a reference matrix is defined which substantially comprises a subset of the set of the binary data elements stored in the storage device 16. This reference matrix is then expanded by adding blank binary data elements between the locations of the already stored binary data elements, whether they are a dot or a blank. To determine whether the added binary data elements are to be converted to a dot, the expanded reference matrix is compared with a predetermined matrix, and to the extent the expanded reference matrix matches the predetermined matrix, the added binary data elements are converted to a dot. The data is then printed.

FIG. 10 illustrates a typical reference matrix that substantially comprises a subset of the set of binary data elements stored in the storage device 16. It comprises a matrix having three columns C1, C2, and C3 and four intersecting horizontal rows R1, R2, R3, and R4. The twelve intersecting locations defining the matrix are designated by the letters A-D, G-K, M-N, P, and they correspond to the stored binary data elements in the storage device 16. The horizontal rows are each vertically spaced by one dot width and the vertical columns are each horizontally spaced by one-half dot width, which corresponds to the spacing of the data stored in the memory device 16. The number of positions in the reference matrix may be larger, but the 3 column by 4 row matrix illustrated is a minimum for enlargement in the data processing made. Since the reference matrix is defined for different portions of the stored binary data elements representing the stored character, some matrix positions may be outside the area defined by the stored binary data and, thus, represent binary data elements that form a portion of the vertical blank space between characters or the horizontal blank space between lines. The positions in the reference matrix representing these binary data elements outside the area defined by the stored binary data are designed as blanks, and specifically the two columns to the left and two columns to the right of the stored binary data.

Referring to FIG. 11, the reference matrix of FIG. 10 as been expanded for 2x enlargement in the data processing mode by adding a single row midway between each of the existing rows, the added rows being designated R1$b$, R2$b$, R3$b$, etc., and the existing rows being designated R1, R2, R3, etc. Similarly, a column is added midway between each of the existing columns, the added columns being designated C1$b$, C2$b$, C3$b$, etc., and the existing columns being designated C1, C2, C3, etc. The spacing between each of the original rows and added rows is one dot width, and the spacing between each of the original columns and added columns is one-half dot width. This doubles the size of the character vertically and horizontally, and quadruples the area and number of positions of the matrix. The positions at the intersections of the added R$b$ rows with the existing C columns and added C$b$ columns, and the intersections of the added C$b$ columns with the existing R rows and added R$b$ rows represent the added blank binary data elements which may later be converted to a dot. The relative positions of the lettered locations A-D, G-K, M-N, P for the stored binary data elements remain the same, with the spacing between them being increased.

FIG. 12 illustrates the expanded reference matrix of FIG. 11 with locations A, B, C, and D defining a predetermined matrix to determine which, if any, of certain ones of the added binary data elements are to be converted to a dot. According to one mode of describing the present invention, the logical operations to perform the comparison are performed using the columns of the matrices. The stored binary data elements in the reference matrix are identified by specifying their relative position with respect to an arbitrarily selected reference row. The reference row of FIG. 12 is row R2, and the remaining rows are correlated to the reference row by logically shifting row R1 down one position (d), row R3 up one position (u) and row R4 up two positions (uu). With row R2 being specified as the reference row in FIG. 12, each of the data positions A-D, G-K, M-N, P are designated as follows:

| | | |
|---|---|---|
| I = C1 d | J = C2 d | K = C3 d |
| G = C1 | A = C2 | B = C3 |
| H = C1 u | C = C2 u | D = C3 u |
| M = C1 uu | N = C2 uu | P = C3 uu |

Having defined the reference matrix (FIG. 10) and expanded it by adding predetermined blank binary data elements (FIG. 11), portions of the expanded reference matrix are compared with a predetermined matrix (FIG. 12) to convert certain of the added blank binary data elements to a dot. To determine, for example, whether the blank added binary data element at location C2$b$, R2$b$ of the expanded reference matrix should be converted to a dot, the expanded reference matrix is first compared to a predetermined matrix to determine if that binary data element is part of a linear component of the character which must be enlarged in the horizontal direction. The predetermined matrix is represented by the following:

$$C2b, R2b = \bar{A} \cdot \bar{D} \cdot B \cdot C + A \cdot D \cdot \bar{B} \cdot \bar{C}$$

This expression states, using Boolean logic, that the binary data element at position C2$b$, R2$b$ is converted to a dot (binary 1) if positions A and D are blanks (binary 0) and positions B and C are dots, or if positions A and D are dots and positions B and C are blanks. Otherwise it remains a blank, unless another predetermined matrix causes it to be converted to a dot. Applying this predetermined matrix to the expanded reference matrix of FIG. 12, if positions A and B are represented by dots and positions C and D are represented by blanks, position C2b,R2b remains a blank.

The status (logical 1 or logical 0) for all of the added binary data elements in the added C2b column, using the columns of the matrix rather than the individual matrix elements, are represented as follows:

$$C2b,Rb = \overline{C2} \cdot \overline{C3u} \cdot C2u \cdot C3 + C2 \cdot C3u \cdot \overline{C2u} \cdot \overline{C3}$$

A comparison of this expression with the previous one illustrates the correlation between the individually lettered binary data element positions A-D, G-K, M-N, P and their respective positions (d, u, uu) with respect to the reference row R2.

No dots are printed at the intersections of the R rows (R1, R2, etc.) and the Cb (C1b, C2b, etc.) columns, i.e. at the R, Cb positions. Thus, such a reference matrix is represented as follows:

$$Cb, R = 00$$

In general form, the predetermined matrices to determine whether the added binary data elements for the C(i)b columns (C1b, C2b, C3b, etc.) are to be converted to a dot are represented as follows:

| | | |
|---|---|---|
| $C(i)b = \bar{x} \cdot \bar{y} u \cdot x u \cdot y + x \cdot y u \cdot \bar{x} u \cdot \bar{y}$ | Rb rows | MATRIX 1 |
| $C(i)b = 00$ | R rows | | where $x = C(i)$ $y = C(i+1)$

As noted earlier, these predetermined matrices convert those added blank binary data elements to a dot which enlarge the character in the horizontal direction.

To enlarge a character in the vertical direction and add vertical thickness, the binary data elements added to all of the positions C,Rb are compared with another predetermined matrix. Referring to the binary data elements added at position C2,R2b, the expanded reference matrix is compared to a predetermined matrix represented by the following:

$$C2,R2b = A \cdot C + \bar{A} \cdot \bar{C} \cdot [(B \cdot H) \cdot (\bar{G} + \bar{M}) \cdot (\bar{D} + \bar{K}) + (G \cdot D) \cdot (\bar{I} + \bar{H}) \cdot (\bar{B} + \bar{P})] + A \cdot (G + B)$$

The status for all of the added binary data elements in the C2 column for all of the Rb positions is represented in column form by the following:

$$C2,Rb = C2 \cdot C2u + \overline{C2} \cdot \overline{C2u} \cdot [(C3 \cdot C1u - ) \cdot (\overline{C1} + \overline{C1uu}) \cdot (\overline{C3u} + \overline{C3d}) + (C1 \cdot C3u) \cdot (\overline{C1d} + \overline{C1u}) \cdot (\overline{C3} + \overline{C3uu})] + C2 \cdot (C1 + C3)$$

This predetermined matrix thickens the upper portion of the character towards the middle, which improves the symmetry and appearance of the enlarged character. More specifically, thickness is added to horizontal lines in the upper portion of the character by converting to a dot those added binary data elements that are generally located beneath a dot representing the stored character. Conversely, for added binary data elements located in the lower portion of the character, only those located above the corresponding stored data elements are converted to a dot. Thus, when the row Rb is in the bottom portion of an enlarged character, the predetermined matrix above for converting the added binary data elements to a dot is modified and represented in column form by the following:

$$C2,Rb = C2 \cdot C2u + (\overline{C2} \cdot \overline{C2u}) \cdot [(C3 \cdot C1u) \cdot (\overline{C1} + \overline{C1uu}) \cdot (\overline{C3u} + \overline{C3d}) + (C1 \cdot C3u) \cdot (\overline{C1d} + \overline{C1u}) \cdot (\overline{C3} + \overline{C3uu})] + (C2 \cdot (C1 + C3))u$$

The original R rows (R1, R2, R3, etc.) of the reference matrix are occupied by the binary data elements stored in the memory device 16.

In general form, the predetermined matrix for determining whether the added binary data elements should be converted to a dot to enlarge a character in the vertical direction and add vertical thickness toward the middle are represented as follows:

| | | |
|---|---|---|
| $C(i) = x$ | R rows | |
| $C(i) = x \cdot xu + (\bar{x} \cdot \bar{x}u) \cdot [y \cdot w\underline{u} \cdot (\overline{w} + \overline{wuu}) \cdot$ | Rb rows- | |
| $(\bar{y}u + \bar{y}d) + w \cdot yu) \cdot (\overline{wd} + \overline{wu}) \cdot$ | upper | |
| $(\bar{y} + \bar{y}uu)] + x \cdot (w + y)$ | portion | MATRIX 2 |
| $C(i) = x \cdot xu + (\bar{x} \cdot \bar{x}u) \cdot [(y \cdot wu) \cdot$ | Rb rows- | |
| $(\overline{w} + \overline{wuu}) \cdot (\bar{y}u + \bar{y}d) + (w \cdot yu) \cdot (\overline{wd} + \overline{wu}) \cdot$ | lower | |
| $(\bar{y} + \bar{y}uu)] + (x \cdot (w + y))u$ | portion | | where $x = C(i)$ $y = C(i+1)$ $w = C(i-1)$

To add thickness to the character in the horizontal direction, the results of comparing the expanded reference matrix with predetermined Matrix 2 are repeated one dot to the right. This is represented by the following:

$$C'(i) = C(i) + C(i-1) \quad \text{MATRIX 3}$$

$$C'(i)b = C(1)b + C(i-1)b \quad \text{MATRIX 4}$$

When thickness is added to a character by converting adjacent binary data elements to a dot at the intersection of a horizontal line and a half diagonal line, more binary data elements may be converted to a dot than are necessary, resulting in two horizontally adjacent dots spaced by only one-half dot width. This increases the density of the linear components beyond that desired for a non-enhanced character. In addition, depending upon the mechanical and electrical characteristics of the printer, it may not be possible to print overlapping dots at the high print speed desired for the lower quality or data processing mode character. Thus, consecutive dots are eliminated by comparing the expanded reference matrix with a predetermined matrix represented by the following:

$$C''(i) = \overline{C''(i-1)b} \cdot C'(i) \quad \text{MATRIX 5}$$

$$C''(i)b = \overline{C''(i-1)} \cdot C'(i)b \quad \text{MATRIX 6}$$

FIG. 13 is a flow chart representing the logical operations performed in accordance with the invention to print characters that are doubled in size (2x) and of a data processing quality (DP). The character is derived from the binary data elements stored in memory device 16 in accordance with the present invention to provide the character illustrated in FIG. 6. At step 20 the sequencing parameters which cause the program to treat each column C(01), C(02), C(03), etc. of the expanded reference matrix are set to their initial values. At step 21 the type of column of the expanded reference matrix (e.g. FIGS. 12, 13) is determined as either column C, representing both stored and added binary data elements, or column Cb, which represents only added binary data elements. The columns of the expanded reference matrix are then compared with the Matrices 1-6 to determine whether or not the added binary data elements should be converted to a dot or remain as a blank, as represented by the steps 22-27. This process may be repeated on a column-by-column basis for each of the K columns, as determined by a counting loop designated at steps 30, 31. When all K columns have been printed, the routine ends.

B. Character Enlargement In The Word Processing Mode

The method described thus far results in the display of characters that have been enlarged and thickened, while the density has not been increased, as illustrated in FIG. 6. For word processing or other applications where character enlargement also requires a higher quality of print, it is preferable that the dot density of the characters be increased so that the lines of the character appear solid with no distortions, as illustrated in FIG. 5. This is done using logical operations similar to those used with the data processing mode character. The stored sets of binary data elements used in the word processing mode are the same stored binary data elements used in the data processing mode, as illustrated in FIG. 9. Thus, only a single set of binary data elements, with each set defining the shape of a respective character, need to be stored to print characters of varying sizes, density, and thickness.

Beginning with the binary data elements as stored in the memory unit 16, where the character has a high density in the horizontal direction and a lower density in the vertical and diagonal directions, an enlarged word processing quality character may be printed by generating additional binary data elements to increase the length of the vertical, diagonal and horizontal linear components thereof, increasing the thickness of the vertical, diagonal and horizontal linear components in a direction orthogonal to the linear direction thereof, and increasing the density of the vertical and diagonal linear components thereof. The horizontal linear components are stored with an increased density. To increase the character beyond the 2x size, it is necessary to further increase the length, thickness, and density of all the linear components thereof.

The method for producing higher quality characters suitable for word processing increases the density of the character enlarged for the lower quality or data processing mode by converting to a dot added binary data elements in positions that are between binary data elements for the data processing mode character. This, in essence, fills in the gaps between the dots of the character along the length of each of the linear components making up the character.

The increased density typically necessitates a second pass of the print head. The data printed during the second pass is not the same as the data printed during the first pass. Depending upon the mechanical and electrical constraints of the specific display device or printer, the printing speed is reduced to one-half the data processing mode speed to permit the additional dots to be printed between the dots of the data processing character in the horizontal direction. To increase the density in the vertical direction, the paper is advanced by a distance equal to one-half the diameter of a dot, and another pass of the print head places the additional dots between the existing dots. Using the 2x size as an example, the character consists of two protions, upper and lower, and each portion requires two passes of the print head to provide the desired dot density. In the discussion that follows the second pass refers to the pass that places dots between existing dots in the vertical direction after the paper has been advanced by one-half the diameter of a dot.

Figure 14:
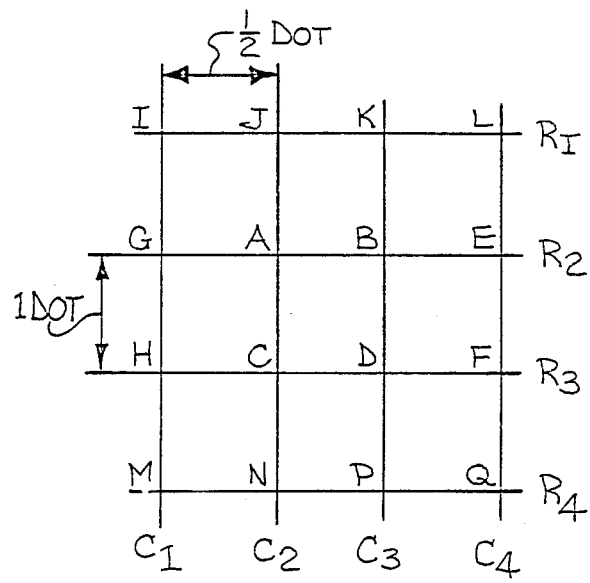
FIG. 14 illustrates diagrammatically a reference matrix for the 1x size to enlarge a character in the word processing or fully enhanced mode. The sixteen matrix positions A-N, P-Q defined by the intersections of the R rows and C columns correspond to the stored binary data elements defining the shape of the character. The horizontal rows R1-R4 are each vertically spaced by one dot width, and the vertical columns C1-C4 are each spaced horizontally by one-half dot width.

FIG. 14 illustrates diagrammatically a reference matrix for the 1x size to enlarge a character in the word processing or fully enhanced mode. The sixteen matrix positions A-N, P-Q defined by the intersections of the R rows and C columns correspond to the stored binary data elements defining the shape of the character. The horizontal rows R1-R4 are each vertically spaced by one dot width, and the vertical columns C1-C4 are each spaced by one-half dot width. The matrix is similar to FIG. 10, with an additional column C4 added to the matrix to provide a total of 16 intersections or matrix positions representing the binary data elements.

FIG. 15 illustrates diagrammatically an expansion of the reference matrix of FIG. 14 for the word processing mode with columns Ca, Cb, and Cc added between each of the existing columns C1, C2, C3, C4, which represent the binary data elements stored in memory element 16. Similarly, rows Ra, Rb, and Rc are added between each of the existing rows R1, R2, R3, and R4, which represent the binary data elements stored in memory device 16. The intersections of the added columns with the added rows and existing rows, and the intersections of the added rows with the stored columns together represent the fifteen blank binary data elements that have been added to the defined reference matrix for each stored binary data element to enlarge the character to a 2x size. The spacing between each of the rows (e.g. R3c and R4) is one-half dot width, and the spacing between each of the columns (e.g. C1 and C1c) is one-fourth dot width. This spacing provides the desired dot overlap in all directions to achieve a higher density character.

The individual stored binary data elements are represented by the letters A-N, P-Q, and may be expressed using columns to specify their relative position to a reference row, such as row R2. For instance, the binary data elements in row R1 may be identified with respect to row R2 by logically shifting the column containing the binary data elements in row R1 down one position (d). The binary data elements in rows R3 and R4 may be specified with respect to the reference row R2 by logically shifting the column up one position (u) or up two positions (uu), respectively. Each of the data positions A-N, P-Q are designed as follows with respect to reference row R2 of FIG. 15:

| | | | |
|---|---|---|---|
| I = C1d | J = C2d | K = C3d | L = C4d |
| G = C1 | A = C2 | B = C3 | E = C4 |
| H = C1u | C = C2u | D = C3u | F = C4u |

-continued

| M = C1uu | N = C2uu | P = C3uu | Q = C4uu |

As noted earlier, characters printed in the word processing mode are printed in two sets of two passes of the print head. The first set prints the upper portion of the character and the second set prints the lower portion of the character. During the first pass of the first set the binary data elements in the R rows R1, R2, R3, etc. are printed using the odd print head wires (1, 3, 5, 7) in the print head 11 and the Rb rows Rb1, Rb2, Rb3, etc. are printed using the even numered print head wires (2, 4, 6) of the print head. During the second pass of the first set, after the paper has been advanced by one-half a dot width, the Ra rows R1a, R2a, R3a, etc. are printed using the odd print head wires and the Rc rows R1c, R2c, R3c, etc. are printed using the even wires.

1. First pass printing

Having expanded the reference matrix by adding predetermined blank binary data elements to the defined reference matrix between the binary data elements of the set of stored binary data elements (FIG. 15), the expanded reference matrix is compared with a predetermined matrix, as noted earlier, and selected ones of the added binary data elements are converted from a blank to a dot when the reference matrix matches the predetermined matrix. The binary data elements at locations C,R, i.e. those designed by letters A–N, P–Q, are obtained from the stored data. The status of the added binary data elements at locations C,Rb; Cb,R; and Cb,Rb, as illustrated in FIG. 16, are determined by comparison with the predetermined matrices described below.

To enlarge the character in the vertical direction, the status of the added blank binary data element at the intersection of column C2 and row R2b is determined by comparing the expanded reference matrix with a predetermined matrix represented by the following:

$$C2,R2b = A \cdot C + \bar{A} \cdot \bar{C} \cdot ((B \cdot H) \cdot (\bar{G} + \bar{M}) \cdot (\bar{D} + \bar{K}) + (G \cdot D) \cdot (\bar{I} + \bar{H}) \cdot (\bar{B} + \bar{P}))$$

The status of the added binary data elements for all of the intersections of the C2 column and Rb rows may be determined by comparing the expanded reference matrix with a predetermined matrix represented by the following:

$$C2,Rb = C2 \cdot C2u + (\bar{C2} \cdot \bar{C2u}) \cdot ((C3 \cdot C1u)) \cdot (\bar{C1} + \bar{C1uu}) \cdot (\bar{C3u} + \bar{C3d}) + (C1 \cdot C3u) \cdot (\bar{C1d} + \bar{C1u}) \cdot (\bar{C3} + \bar{C3uu}))$$

In general form, the status of the added binary data elements for all columns C1, C2, C3, etc. of the expanded reference matrix for enlarging the character in the vertical direction may be determined by comparison with a predetermined matrix represented by the following:

| C(i) = x | R rows | |
| C(i) = x·xu+(x̄·x̄u)·((y·wu)·(w̄+w̄uu)·(ȳu+ȳd) + (w·yu)·(w̄d+w̄u)·(ȳ+ȳuu)) | Rb rows | MATRIX 7 | where $$x = C(i)$$

$$y = C(i+1)$$

$$w = C(i-1)$$

To enlarge the character in the horizontal direction and maintain its high density in the horizontal direction, the added blank binary data elements at locations Cb,R and Cb,Rb are compared with another set of predetermined matrices to determine which binary data elements should be converted to a dot. The binary data elements at the intersection of column C2b and row R2 are compared to a predetermined matrix represented by the following:

$$C2b,R2 = A \cdot B$$

The status of the added binary data elements for all of the intersection of column C2b and the R rows, R1, R2, R3, etc. are determined by comparison with the predetermined matrix represented by the following:

$$C2b,R = C2 \cdot C3$$

The status of the added binary data elements located at the intersection of colulmn C2b and row R2b is determined by comparison with the predetermined matrix represented by the following:

$$C2b,R2b = A \cdot D \cdot \bar{C} \cdot \bar{B} + \bar{A} \cdot \bar{D} \cdot C \cdot B$$

Combining the above matrices, all of the added binary data elements located at the intersections of the columns C2b, and Rb rows R1b, R2b, R3b, etc. are determined by comparison with the predetermined matrix represented by the following:

$$C2b,Rb = C2 \cdot C3u \cdot \bar{C2u} \cdot \bar{C3} + \bar{C2} \cdot \bar{C3u} \cdot C2u \cdot C3$$

Thus, in general form, the status of the blank added binary data elements for all of the Cb columns, C1b, C2b, C3b, etc., which enlarge the character in the horizontal direction and maintain its high density in the horizontal direction, may be determined by comparing the expanded reference matrix with a predetermined matrix represented by the following:

| C(i)b = x·y | R rows | MATRIX 8 |
| C(i)b = x·yu·x̄u·ȳ + x̄·ȳu·xu·y | Rb rows | | where $$x = C(i)$$

$$y = C(i+1)$$

The added binary data elements for the Ca and Cc columns remain a blank for enlargement to the 2x size.

To add thickness to the character in the horizontal direction, the expanded reference matrix is compared with predetermined matrices represented by the following:

$$C'(i) = C(i-1) + C(i) \qquad \text{MATRIX 9}$$

$$C'(i)b = C(i-1)b + C(i)b \qquad \text{MATRIX 10}$$

Figure 17:
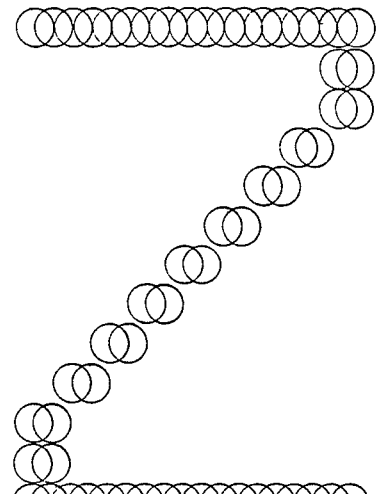
FIG. 17 illustrates the combined generated additional binary data elements and stored binary data elements after making the first two of four passes for an exemplary word processing or enhanced character enlarged to 2x size as displayed by a dot matrix printer.
Figure 19B:
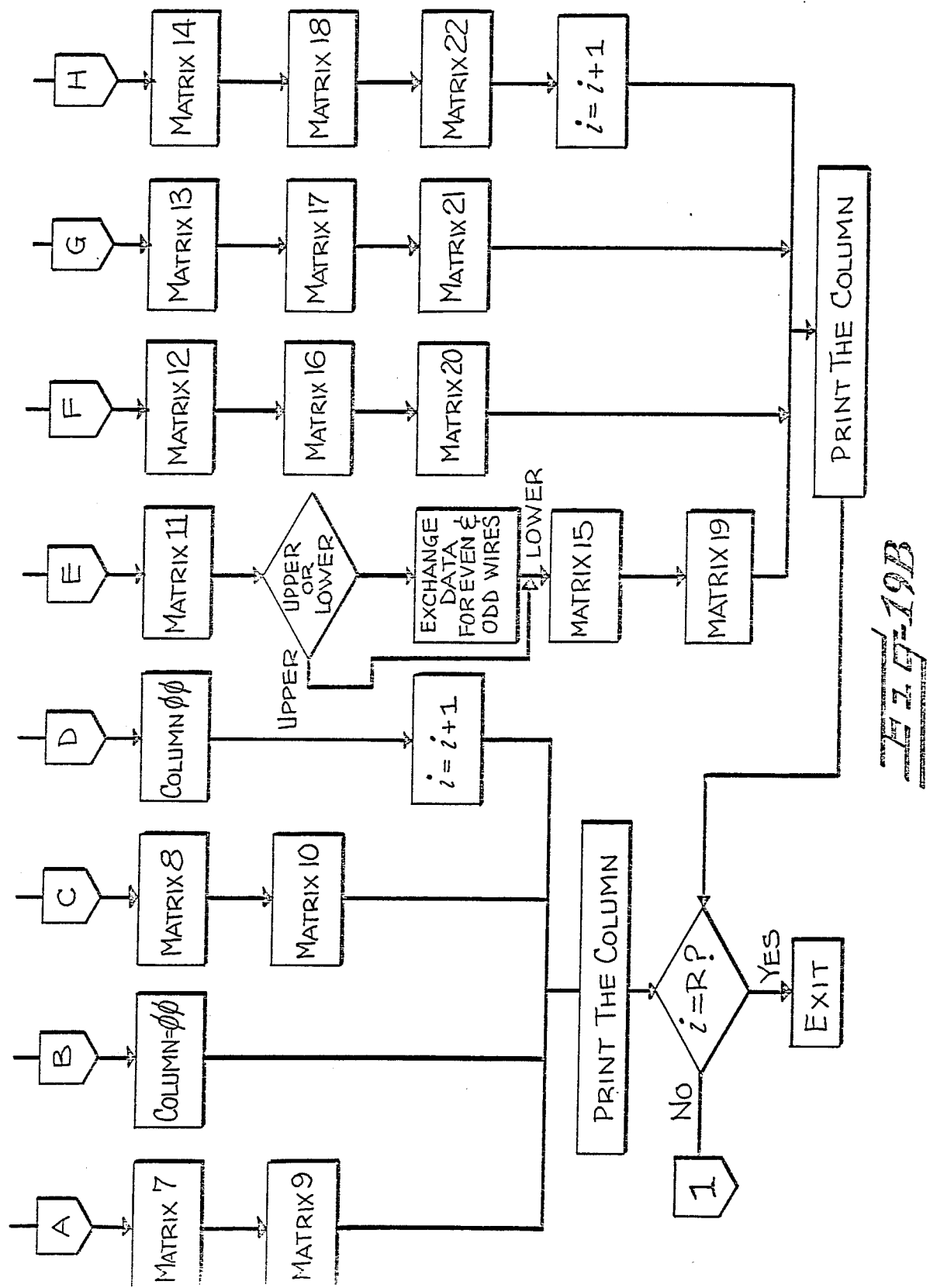

FIG. 17 illustrates the combination of the generated additional binary data elements and stored binary data elements after making two of the four passes for an exemplary word processing quality character enlarged to 2x size as displayed by a dot matrix printer. The flow chart of FIG. 19 illustrates the logical operations just discussed.

2. Second Pass Printing

Figure 18:
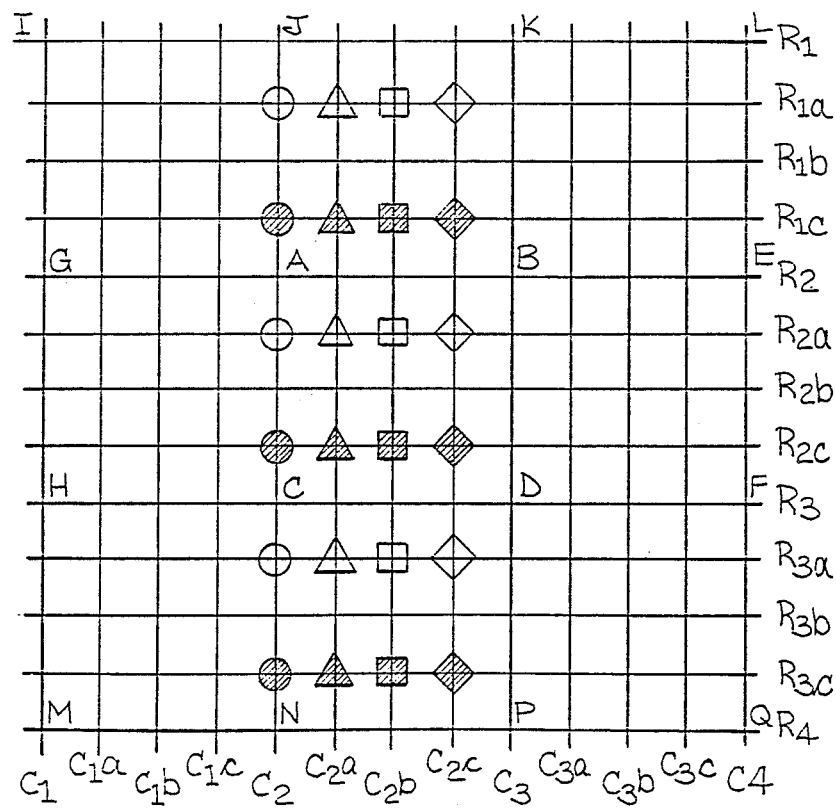
FIG. 18 illustrates diagrammatically the expanded reference matrix of FIG. 15 with locations A-N, P-Q defining a predetermined matrix to determine which, if any, of the added binary data elements are to be converted to a dot for the added binary data elements at locations C, Ra; Ca, Ra; Cb, Ra; Cc, Ra; C, Rc; Ca, Rc; Cb, Rc; and Cc, Rc.

To thicken the character in the vertical direction and increase the density in the vertical direction, referring to FIG. 18, the status of the added binary data element at the intersection of column C2 and row R2a of the expanded reference matrix is determined by comparison to a predetermined matrix represented by the following:

$$C2, R2a = A \cdot (G + B + C)$$

The status of all of the added binary data elements at the intersection of column C2 and the Ra rows R1a, R2a, R3a, etc. are determined by comparison to a predetermined matrix represented by the following:

$$C2, Ra = C2 \cdot (C1 + C3 + C2u)$$

The status of the added binary data element at the intersection of column C2 and row R2c of the expanded reference matrix is determined by comparison to a predetermined matrix represented by the following:

$$C2, R2c = A \cdot C$$

The status of all the added binary data elements at the intersection of column C2 and the Rc rows R1c, R2c, R3c, etc. of the expanded reference matrix are determined by comparison to a predetermined matrix represented by the following:

$$C2, Rc = C2 \cdot C2u$$

Thus, in general form, the status of all of the added binary data elements for all columns C1, C2, C3, etc. at the intersections with the Ra and Rc rows, which thicken the character in the vertical direction and increase the density in the vertical direction, are determined by comparison to a predetermined matrix represented by the following:

| C(i) = x·(y+w+xu) | Ra rows | MATRIX 11 |
|---|---|---|
| C(i) = x·xu | Rc rows | | where $$x = C(i)$$

$$y = C(i+1)$$

$$w = C(i-1)$$

Matrix 11 serves a dual role by thickening the character toward the central portion or middle to improve character symmetry. It adds thickness downwardly to the horizontal lines in the upper portion of the character (i.e. the upper three rows of a seven row character) by converting to a dot those added binary data elements at locations generally below the corresponding binary data element locations representing the stored character. However, the horizontal lines in the lower portion of the character (i.e. the lower four rows of a seven row character) are thickened upwardly by converting to a dot the added binary data elements at locations generally above the corresponding binary data element locations representing the stored character. (See the later discussion in connection with FIGS. 20, 21 for more detail.) This is accomplished by exchanging the data between the odd and even wires of the print head as determined by predetermined Matrix 11 and illustrated in FIGS. 19A and 19B.

To increase the density of the half diagonal linear components, the status of the added blank binary data element at the intersection of column C2a and row R2a of the expanded reference matrix is determined by comparison to a predetermined matrix represented by the following:

$$C2a, R2a = A \cdot D \cdot \overline{C} \cdot \overline{B}$$

The status of all of the added binary data elements at the intersections of column C2a and the Ra rows R1a, R2a, R3a, etc. of the expanded reference matrix are determined by comparison to a predetermined matrix represented by the following:

$$C2a, Ra = C2 \cdot C3u \cdot \overline{C2u} \cdot \overline{C3}$$

The status of the added binary data element at the intersection of column C2a and row R2c of the expanded reference matrix is determined by comparison to a predetermined matrix represented by the following:

$$C2a, R2c = C \cdot B \cdot \overline{A} \cdot \overline{D}$$

The status of all of the added binary data elements at the intersections of colulmn C2a and the Rc rows R1c, R2c, R3c, etc. of the expanded reference matrix are determined by comparison to a predetermined matrix represented by the following:

$$C2a, Rc = C2u \cdot C3 \cdot \overline{C2} \cdot \overline{C3u}$$

In general form the status of all of the blank added binary data elements at the intersections of all Ca columns C1a, C2a, C3a, etc. of the expanded reference matrix, which increase the density of the half diagonal linear components, are determined by comparison to a predetermined matrix represented by the following:

| C(i) = x·yu·x̄u·ȳ | Ra rows | MATRIX 12 |
|---|---|---|
| C(i) = xu·y·x̄·ȳu | Rc rows | | where $$x = C(i)$$

$$y = C(i+1)$$

To increase the density of the full diagonal linear components of the characters, the status of the added binary data element at the intersection of colulmn C2b, and row R2a of the expanded reference matrix is determined by comparison to a predetermined matrix represented by the following:

$$C2b, R2a = B \cdot H \cdot A \cdot \overline{C} \cdot (\overline{G} + \overline{M}) \cdot (\overline{K} + \overline{D}) + A \cdot F \cdot \overline{B} \cdot \overline{D} \cdot (\overline{J} + \overline{C}) \cdot (\overline{E} + \overline{Q})$$

The status of all of the added binary data elements at the intersections of column C2b and the Ra rows R1a, R2a, R3a, etc. of the expanded reference matrix are determined by comparison to a predetermined matrix presented by the following:

$$C2b,Ra = C3 \cdot C1u \cdot \overline{C2} \cdot \overline{C2u} \cdot (\overline{C1} + \overline{C1uu}) \cdot (\overline{C3d} + \overline{C3u}) + C2 \cdot C4u \cdot \overline{C3} \cdot \overline{C3u} \cdot (\overline{C2d} + \overline{C2u}) \cdot (\overline{C4} + \overline{C4uu})$$

The status of the added binary data element at the intersection of column C2b and row R2c of the expanded reference matrix is determined by comparison to a predetermined matrix represented by the following:

$$C2b,R2c = G \cdot D \cdot \overline{A} \cdot \overline{C} \cdot (\overline{I} + \overline{H}) \cdot (\overline{B} + P) + C \cdot E \cdot \overline{B} \cdot \overline{D} \cdot (\overline{A} + \overline{N}) \cdot (\overline{L} + F)$$

The status of all of the added binary data elements at the intersections of column C2b and the Rc rows R1c, R2c, R3c, etc. of the expanded reference matrix are determined by comparison to a predetermined matrix represented by the following:

$$C2b,Rc = C1 \cdot C3u \cdot \overline{C2} \cdot \overline{C2u} \cdot (\overline{C1d} + \overline{C1u}) \cdot (\overline{C3} + \overline{C3u-u}) + C2u \cdot C4 \cdot \overline{C3} \cdot \overline{C3u} \cdot (\overline{C2} + \overline{C2uu}) \cdot (\overline{C4d} + \overline{C4u})$$

In general form, the status of all of the blank added binary data elements for all Cb columns C1b, C2b, C3b, etc. to enhance the full diagonal linear components of the expanded reference matrix are determined by comparison to a predetermined matrix represented by the following:

| | | |
|---|---|---|
| $Cb,Ra = w \cdot yu \cdot \bar{x} \cdot \bar{x}u \cdot (\bar{y} + \bar{y}uu) \cdot (\overline{wd} + \overline{wu}) + x \cdot zu \cdot \overline{w} \cdot wu \cdot (\bar{x}d + \bar{x}u) \cdot (\bar{z} + \bar{z}uu)$ | Ra rows | MATRIX 13 |
| $Cb,Rc = y \cdot wu \cdot \bar{x} \cdot \bar{x}u \cdot (\bar{y}d + \bar{y}u) \cdot (\overline{w} + \overline{wuu}) + xu \cdot z \cdot \overline{w} \cdot wu \cdot (\bar{x} + \bar{x}uu) \cdot (\bar{z}d + \bar{z}u)$ | Rc rows | | where $x = C(i)$ $y = C(i-1)$ $w = C(i+1)$ $z = C(i+2)$

To increase the density of other half diagonal linear components, the status of the added blank binary data element at the intersection of column C2c and row R2a of the expanded reference matrix is determined by comparison to a predetermined matrix represented by the following:

$$C2c,R2a = C \cdot B \cdot \overline{A} \cdot \overline{D}$$

The status of all of the added binary data elements at the intersections of column C2c and the Ra rows R1a, R2a, R3a, etc. of the expanded reference matrix are determined by comparison to a predetermined matrix represented by the following:

$$C2c,Ra = C2u \cdot C3 \cdot \overline{C2} \cdot \overline{C3u}$$

The status of all of the added binary data element at the intersection of column C2c and row R2c of the expanded reference matrix is determined by comparison to a predetermined matrix represented by the following:

$$C2c,R2c = A \cdot D \cdot \overline{C} \cdot \overline{B}$$

The status of all of the added binary data elements at the intersections of column C2c and the Rc rows R1c, R2c, R3c, etc. of the expanded reference matrix are determined by comparison to a predetermined matrix represented by the following:

$$C2c,Rc = C2 \cdot C3u \cdot \overline{C2u} \cdot \overline{C3}$$

In general form, the status of all of the added blank binary data elements for all Cc columns C1c, C2c, C3c, etc. for increasing the density of other half diagonals of the expanded reference matrix are determined by comparison to a predetermined matrix represented by the following:

| | | |
|---|---|---|
| $C(i) = \bar{x} \cdot \bar{y}u \cdot xu \cdot y$ | Ra rows | MATRIX 14 |
| $C(i) = \bar{x}u \cdot \bar{y} \cdot x \cdot yu$ | Rc rows | | where $x = C(i)$ $y = C(i+1)$

To add thickness to the character in the horizontal direction, each binary data element of the expanded reference matrix as determined by comparison with Matrices 11 to 14 is duplicated two matrix positions to the right. The status of these binary data elements is determined by comparison to predetermined matrices represented by the following:

| | |
|---|---|
| $C'(i) = C(i-1)b + C(i)$ | MATRIX 15 |
| $C'(i)a = C(i-1)c + C(i)a$ | MATRIX 16 |
| $C'(i)b = C(i) + C(i)b$ | MATRIX 17 |
| $C'(i)c = C(i)a + C(i)c$ | MATRIX 18 |

When adding thickness to the character by duplicating the binary data elements, undesired adjacent horizontal dots a half dot apart may be generated that make the character too dense. The binary data elements representing the consecutive dots are selectively converted back to a blank by comparison to the predetermined matrices represented by the following:

| | |
|---|---|
| $C''(i) = \overline{C'(i-1)c} \cdot C'(i)$ | MATRIX 19 |
| $C''(i)a = \overline{C'(i)} \cdot C'(i)a$ | MATRIX 20 |
| $C''(i)b = \overline{C'(i)a} \cdot C'(i)b$ | MATRIX 21 |
| $C''(i)c = \overline{C'(i)b} \cdot C'(i)c$ | MATRIX 22 |

After the second pass over the character illustrated in FIG. 17, the character illustrated in FIG. 5 is produced.

FIG. 19 is a flow chart representing the logical operations to be performed in accordance with the invention to print characters that are doubled in size and enhanced in the word processing mode (2x, WP) as illustrated in FIG. 5. Referring to step 40, the data representing the column positions at the left and right of the stored matrix and the data therein are initialized and set to zero. At step 41 the pass of the print head is determined as either first or second. At steps 42, 43 the type of column is determined as C, Ca, Cb, or Cc for the column-by-column determination of which added binary data elements are to be converted from a blank to a dot. After determining the type of column of the expanded reference matrix, comparisons are made between the expanded reference matrices and the predetermined matrices as defined above in Matrices 7-22. After making the appropriate comparisons, each column is printed, and the process is repeated for the second pass following step 41. When all R columns have been printed, the routine ends.

Figure 20:
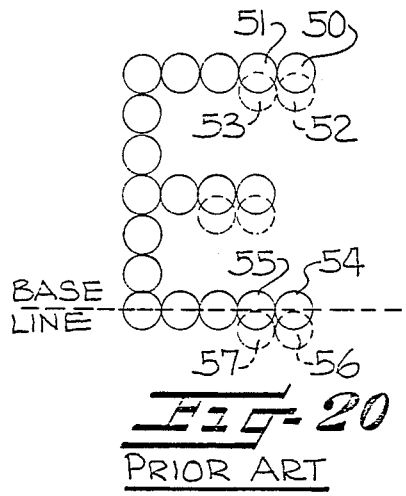
FIG. 20 illustrates diagrammatically how a character was thickened vertically in the prior art by printing all horizontal lines a second time one-half dot lower than they were printed the first time.
Figure 21:
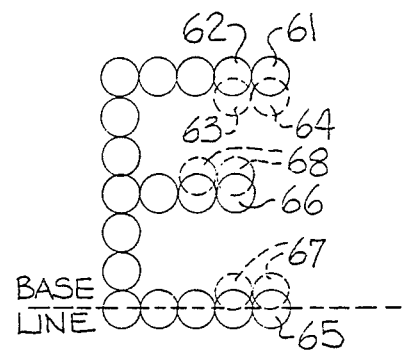
FIG. 21 illustrates diagrammatically how a character is vertically thickened toward the central portion or middle in accordance with the present invention.

Referring to FIGS. 20 and 21, the thickening of the horizontal line components of a dot matrix character as practiced in the prior art is compared to the thickening toward the middle as in the present invention. Referring to FIG 20, the horizontal components of characters were thickened vertically by printing all horizontal lines a second time one half dot lower than they were printed the first time, and this was usually done using the same data for both the first and second passes. Thus, each of the dots, such as 50, 51 were duplicated one half position lower as at positions 52, 53. While this is generally acceptable for the upper portions of the character, it is undesirable for dots extending to the baseline because the character loses it symmetry and extends below the baseline as illustrated by the thickening of dots 54, 55 by dots 56, 57.

Referring to the character of FIG. 21, the binary data elements for the character are logically processed to print a character that is vertically thickened toward the middle, which preserves the baseline of the original character. The horizontal linear components in the upper portion of the character, such as represented by dots 61, 62, are thickened by converting to a dot those binary data elements 63, 64 immediately below the corresponding binary data elements 61, 62. For the horizontal linear components the lower portion of the character, such as represented by dots 65, 66, the binary data elements immediately above the corresponding stored binary data elements are converted to a dot. Those binary data elements in the central portion of the character may be thickened upwardly or downwardly as necessary or desirable. The method of actually displaying such characters was described earlier in connection with enlargement in the word processing mode, second pass printing, Matrix 11. Apparatus for displaying such characters is described in connection with FIGS. 1, 2, 3, and 24.

To display the enlarged character of FIG. 8, logical operations are performed on the set of stored binary data elements to generate additional binary data elements that enlarge the character and increase its density but not its thickness. Using sets of stored binary data elements which define characters having a high density in the horizontal direction and a lower density in the vertical and diagonal directions (i.e. as in FIG. 9), the logical ooperations increase the length of the vertical, diagonal and horizontal linear components thereof, maintain the thickness of the vertical, diagonal, and horizontal linear components in the direction generally orthogonal to their linear direction, and selectively increase the density of the vertical and diagonal linear components while maintaining the high density of the horizontal linear components. Such characters obtained by following the method for producing a character expanded to the 2x size in the word processing mode, as described earlier, but utilizing only predetermined Matrices 7, 8, and 12-14 as illustrated in FIG. 22, and substituting for Matrix 11 the following:

| | | |
|---|---|---|
| $C(i) = x \cdot xu$ | Ra Rows | MATRIX 11A |
| $C(i) = x \cdot xu$ | Rc Rows | |
| where | | |
| $x = C(i)$ | | |

To display the enlarged character of FIG. 7, logical operations are performed on the set of stored binary data elements to generate additional binary data elements that enlarge the character without thickening or increasing the density of the linear components. Using sets of stored binary data elements which define characters having a high density in the horizontal direction and a lower density in the vertical and diagonal directions, such characters are obtained by following the method for producing a character expanded to the 2x size in the data processing mode, as described earlier, but using only predetermined Matrix 1 and substituting for Matrix 2 the Matrix 2A as represented below.

| | |
|---|---|
| $C(i) = x$ | R rows |
| $C(i) = x \cdot xu + (\bar{x} \cdot \bar{x}u) \cdot [(y \cdot wu) \cdot (\overline{w} + \overline{wuu}) \cdot (\bar{y}u + \bar{y}d) + (w \cdot yu) \cdot (\overline{wd + wu}) \cdot (\bar{y} + \bar{y}uu)]$ | Rb rows  MATRIX 2A | where $x = C(i)$ $y = C(i+1)$ $w = C(i-1)$

Figure 23:
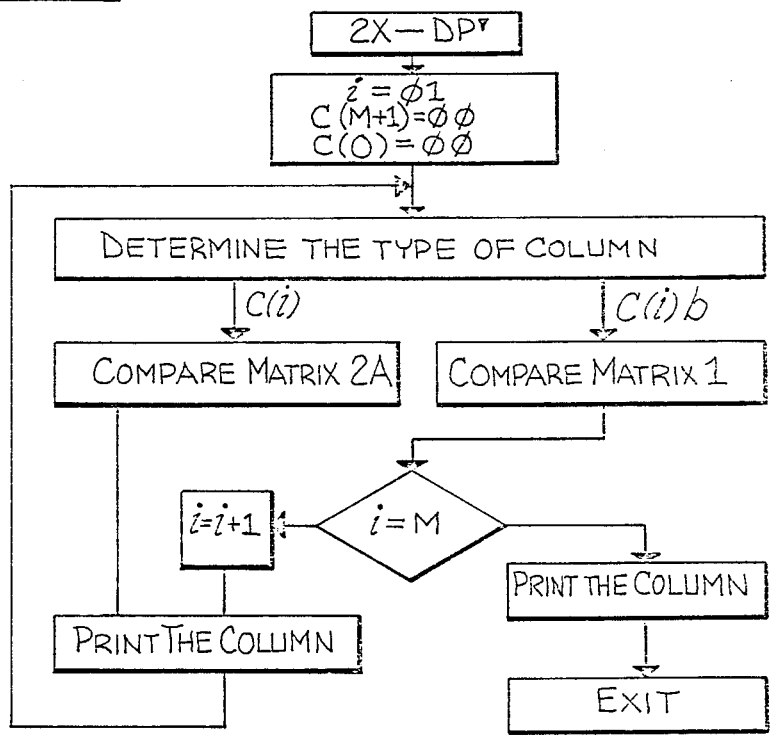
FIG. 23 is a flow chart representing the logical operations performed in accordance with the invention to print characters enlarged to the 2x size with the linear components thereof neither thickened nor made more dense, as in FIG. 7.

The flow chart representing this sequence of operations is shown in FIG. 23.

As noted earlier, still other logical operations may be performed to display a character where some but not all of the linear components are thickened or have an increased density. For example, the character may be enlarged with the horizontal components being enhanced by thickening and increasing the density thereof, while the diagonal and vertical components are not enhanced and are of the data processing quality. Using sets of stored binary data elements which define characters having a high density in the horizontal direction and a lower density in the vertical and diagonal directions, such characters are obtained by following the method for producing a character expanded to the 2x size in the word processing mode (FIG. 19), but omitting the logical operations of making comparisons with Matrices 15, 16, 17 and 18.

In a similar fashion logical operations may be performed on the stored binary data elements to ultimately display characters where the horizontal linear components are of a data processing quality and the diagonal and vertical components are of an enhanced word processing quality. Referring to the flow chart of FIG. 19, it is modified to display such a character by substituting Matrix 11A below for Matrix 11, omitting the logical operations represented by Matrices 19, 20, 21, and 22, and eliminating the step of exchanging the data for the even and odd wires when printing the second pass for the lower portion of the character.

| | | |
|---|---|---|
| $C(i) = x \cdot xu$ | Ra rows | MATRIX 11A |
| $C(i) = x \cdot xu$ | Rc rows | | where $$x = C(i)$$

Logical operations may be performed on a set of the stored binary data elements to display a character having linear components where the horizontal components are of a word processing quality and the vertical and diagonal components are of a thickened word processing quality, meaning that they have the increased density of the word processing quality character but have been thickened more than usual to be two dots thick, rather than one and one-half dots thick. Referring to the flow chart of FIG. 19, it is modified by replacing Matrices 15, 16, 17, and 18 with Matrices 15A, 16A, 17A, and 18A, respectively, as set forth below:

| | |
|---|---|
| $C'(i) = C(i) + C(i-1)b + C(i-1)c$ | MATRIX 15A |
| $C'(i)a = C(i)a + C(i) + C(i)c$ | MATRIX 16A |
| $C'(i)b = C(i)a + C(i) + C(i-1)c$ | MATRIX 17A |
| $C'(i)c = C(i)b + C(i)a + C(i)$ | MATRIX 18A |

Logical operations may be performed on a set of the stored binary data elements to display a character having linear components wherein the vertical and diagonal lines are of the word processing quality, and the horizontal lines are of a word processing quality that has been thickened. For instance, the horizontal lines are two dots wide, while the other lines are one and a half dots wide, with the dots overlapping to provide the increased density. Referring to the flow chart of FIG. 19, it is modified to display such a character by replacing Matrices 7 and 8 with Matrices 7A and 8A, respectively, as represented by the following:

| | |
|---|---|
| $C(i) = x$ | R rows |
| $C(i) = \overline{x \cdot xu} + (\overline{x} \cdot \overline{xu}) [(y \cdot wu) \cdot (\overline{w} + \overline{wuu}) \cdot (\overline{y}u + \overline{y}d) +$ | MATRIX 7A |
| $(w \cdot uy) \cdot (wd + \overline{wu}) \cdot (\overline{y} + \overline{y}uu)] + x(w + y)$ | Rb rows |
| $C(i)b = x \cdot y$ | R rows |
| $C(i)b = \overline{x} \cdot \overline{y}u \cdot xu \cdot y + x \cdot yu \cdot \overline{x}u \cdot \overline{y} + x \cdot y$ | MATRIX 8A |
| | Rb rows | where $$x = C(i)$$

$$y = C(i+1)$$

$$w = C(i-1)$$

Logical operations may also be performed on a set of the stored binary data elements to display a character where all of the component lines are of the enhanced word processing quality and have been thickened more than usual. Referring to the flow chart of FIGS. 19A and 19B, it is modified to display such a character by replacing Matrices 7, 8, 15, 16, 17, and 18 with Matrices 7A, 8A, 15A, 16A, 17A, and 18A, respectively, as represented above. Similar matrices may be used to selectively add or delete varying amounts of thickness to the various vertical, horizontal, and diagonal components of enlarged characters by changing the logical operations performed on the stored data. Similarly, the character may be enlarged differentially in varying degrees, i.e. to provide characters that are enlarged to a 2x size in the vertical direction but retained in their usual 1x size in the horizontal direction. This allows one to provide varying pitch to select between, for example, 10 characters per inch or 12 characters per inch.

FIG. 24 illustrates diagrammatically apparatus for displaying enlarged dot matrix characters that may be selectively enlarged or selectively thickened, or selectively made more dense, in accordance with the present invention. The circuitry includes a control unit 71, a character data storage element 72, a logic unit 73, a print medium controller 74 connected to the tractor motor 9, a print head movement controller 76 attached to the print head motor 13, and a print head actuator 75 connected to the print head 15 to control the actuation of each of the individual print wires 14.

The sets of binary data elements are stored in the character data storage means 72, which includes a plurality of storage devices 16, as referred to in FIG. 9. Binary data representing either a dot or a blank in a matrix of positions arranged in horizontal rows and vertical columns is stored in each of the storage devices 16, and together the stored data represents a character.

The logic unit 73 includes means for performing logical operations on the selected sets of binary data elements representing the various characters. It may, among other things, address the appropriate data representing the desired character, read out the data representing the desired character, define a reference matrix for each character, expand the reference matrix by adding blank binary data elements, compare selected portions of the expanded reference matrix with a predetermined matrix, and convert those binary data elements to a dot that match the predetermined matrix. As instructed by the control unit, this will result in characters which are selectively enlarged, thickened, and made more dense as desired by the operator of the printer.

The control unit 71 includes means governing the data processing and mechanical functions of the printer, coordinates their respective operations, and may further communicate with a host computer. Management of the data processing may include control of the character data storage means 72 and the logic unit 73. Control of the mechanical operation of the printer may include control of the print medium or paper, print head movement, and the actuation of the wires in the print head.

The print medium controller 74 provides signals to the motor 9 to control the movement of the print medium 2 over the platen and past the print head.

The print head movement controller 76 provides signals to the print head motor 13 to control the translational movement of the print head across the print medium 2.

The print head actuator 75 provides signals to actuate the individual printing elements 14 of the print head 11 under control of signals from the control unit 71 and in accordance with the data signals from the data storage unit 72 and from logic unit 73. The control unit 71 typically coordinates the flow of data to the print head actuator with the physical movement of the print head.

While the invention has been described with respect to a specific dot matrix printer, and in connection with 2x enlargement, it is to be understood that it may be used in connection with any device that will display a dot matrix character of any size. For instance, the specific embodiment generally describes left to right printing. However, right to left printing is possible by simply starting the operations at the right end of the matrix and progressing towards the left.

What is claimed is:

1. A method of displaying enlarged dot matrix characters comprised of selected binary data elements representing either a dot or a blank in a matrix of positions arranged in horizontal rows and vertical columns, the method comprising
   (a) storing sets of binary data elements, each set defining a respective character having horizontal linear components of a high density and vertical and diagonal linear components of a low density;
   (b) performing logical operations on a set of the stored binary data elements to generate associated additional binary data elements which enlarge the size of the respective character in at least one of the vertical and horizontal directions by lengthening the diagonal linear components and the selected vertical or horizontal linear components; and
   (c) selectively using the generated associated additional binary data elements together with the stored binary data elements to display characters in which the diagonal and selected vertical or horizontal linear components thereof are lengthened to display a character of enlarged size.

2. The method of claim 1 wherein the step of performing logical operations on a set of the stored binary elements to generate associated additional binary data elements comprises generating additional binary data elements to increase the length of the horizontal, diagonal and vertical linear components thereof.

3. The method of claim 1 wherein the step of performing logical operations on a set of the stored binary elements to generate associated additional binary data elements comprises
   (a) defining a reference matrix substantially comprising a subset of the set of stored binary data elements;
   (b) expanding the reference matrix by adding blank binary data elements to the defined reference matrix between the binary data elements of the set of stored binary data elements; and
   (c) comparing selected portions of the expanded reference matrix with corresponding selected portions of a predetermined matrix and converting selected added binary data elements to a dot when the reference matrix matches the predetermined matrix.

4. The method of claim 1 wherein the step of performing logical operations further comprises performing logical operations which selectively enhance the respective character by thickening and defining more densely at least one of the vertical, diagonal and horizontal linear components thereof, and the step of selectively using the generated associated additional binary data elements further comprises selectively using the generated associated additional binary data elements to display characters in which at least one of the vertical, diagonal and horizontal linear components thereof are selectively thickened in a direction generally orthogonal to the linear direction thereof and selectively made more dense along the length thereof.

5. The method of claim 4 wherein the step of performing logical operations further comprises generating additional binary data elements to increase the length of the vertical, diagonal and horizontal linear components thereof, to selectively increase the thickness of the vertical, diagonal and horizontal linear components thereof in a direction generally orthogonal to the linear direction thereof, the selectively increase the density of the vertical and diagonal linear components thereof, and to maintain the high density of the horzontal linear components thereof.

6. The method of claim 1 wherein the step of performing logical operations further comprises performing logical operations which selectively enhance the respective character by thickening at least one of the vertical, diagonal and horizontal linear components thereof, and the step of selectively using the generated associated additional binary data elements further comprises selectively using the generated associated additional binary data elements to display characters in which at least one of the vertical, diagonal and horizontal linear components thereof are selectively thickened in a direction generally orthogonal to the linear component thereof.

7. The method of claim 6 wherein the step of performing logical operations on a set of the stored binary elements to generate associated additional binary data elements comprises generating additional binary data elements to increase the length of the vertical, diagonal and horizontal linear components thereof, and to increase the thickness of the vertical, diagonal and horizontal linear components thereof in a direction orthogonal to the linear direction thereof.

8. The method of claim 6 wherein the step of selectively using the generated associated additional binary data elements comprises positioning each of the generated binary data elements to thicken the upper portion of the character downwardly and the lower portion of the character upwardly.

9. The method of claim 1 wherein the step of performing logical operations further comprises performing logical operations which selectively enhance the respective character by defining more densely at least one of the vertical, diagonal and horizontal linear components thereof, and the step of selectively using the generated associated additional binary data elements further comprises selectively using the generated associated additional binary data elements to display characters in which at least one of the vertical, diagonal and linear components thereof are selectively made more dense along the length thereof.

10. The method of claim 9 wherein the step of performing logical operations on a set of the stored binary elements to generate associated additional binary data elements comprises generating additional binary data elements to increase the length of the vertical, diagonal and horizontal linear components thereof, to selectively increase the density of the vertical and diagonal linear components thereof, and to maintain the the density of the horizontal linear components thereof.

11. Apparatus for displaying enlarged dot matrix characters comprised of selected binary data elements representing either a dot or a blank in a matrix of positions arranged in horizontal rows and vertical columns, the apparatus comprising
   (a) means for storing sets of binary data elements, each set defining a respective character having horizontal linear components of a high density and vertical and diagonal linear components of a low density;
   (b) means for performing logical operations on a set of the stored binary data elements to generate associated additional binary data elements which enlarge the size of the respective character in at least one of the vertical and horizontal directions by lengthening the diagonal linear components and the selected vertical or horizontal linear components; and (c) means for selectively using the generated associated additional binary data elements together with the stored binary data elements to display characters in which the diagonal and selected vertical or horizontal linear components thereof are lengthened to display a character of enlarged size.

12. The apparatus of claim 11 wherein the means for performing logical operations on a set of the stored binary elements to generate associated additional binary data elements comprises means for generating additional binary data elements to increase the length of the horizontal, diagonal and vertical linear components thereof.

13. The apparatus of claim 11 wherein the means for performing logical operations on a set of the stored binary elements to generate associated additional binary data elements comprises (a) means for defining a reference matrix substantially comprising a subset of the set of stored binary data elements;

(b) means for expanding the reference matrix by adding blank binary data elements to the defined reference matrix between the binary data elements of the set of stored binary data elements; and (c) means for comparing selected portions of the expanded reference matrix with corresponding selected portions of a predetermined matrix and converting selected added binary data elements to a dot when the reference matrix matches the predetermined matrix.

14. The apparatus of claim 11 wherein the means for performing logical operations further comprises means for performing logical operations which selectively enhance the respective character by thickening and defining more densely at least one of the vertical, diagonal and horizontal linear components thereof, and the means for selectively using the generated associated additional binary data elements further comprises means for using the generated associated additional binary data elements to display characters in which the vertical, diagonal and horizontal linear components thereof are selectively thickened in a direction generally orthogonal to the linear direction thereof and selectively made more dense along the length thereof.

15. The apparatus of claim 14 wherein the means for performing logical operations comprises means for generating additional binary data elements to increase the length of the vertical, diagonal and horizontal linear components thereof, to selectively increase the thickness of the vertical, diagonal and horizontal linear components thereof in a direction generally orthogonal to the linear direction thereof, to selectively increase the density of the vertical and diagonal linear components thereof, and to maintain the high density of the horizontal linear components thereof.

16. The apparatus of claim 11 wherein the means for performing logical operations further comprises means for performing logical operations which selectively enhance the respective character by thickening at least one of the vertical, diagonal and horizontal linear components thereof, and the means for selectively using the generated associated additional binary data elements further comprises means for selectively using the generated associated additional binary data elements to display characters in which the vertical, diagonal and horizontal linear components thereof are selectively thickened in a direction generally orthogonal to the linear direction thereof.

17. The apparatus of claim 16 wherein the means for performing logical operations on a set of the stored binary elements to generate associated additional binary data elements comprises means for generating additional binary data elements to increase the length of the vertical, diagonal and horizontal linear components thereof, and to increase the thickness of the vertical, diagonal and horizontal linear components thereof in a direction orthogonal to the linear direction thereof.

18. The apparatus of claim 11 wherein the means for performing logical operations further comprises means for performing logical operations which selectively enhance the respective character by defining more densely at least one of the vertical, diagonal and horizontal linear components thereof, and the means for selectively using the generated associated additional binary data elements further comprises means for selectively using the generated associated additional binary data elements to display characters in which the vertical, diagonal and horizontal linear components thereof are selectively made more dense along the length thereof.

19. The apparatus of claim 18 wherein the means for performing logical operations on a set of the stored binary elements to generate associated additional binary data elements comprises means for generating additional binary data elements to increase the length of the vertical, diagonal and horizontal linear components thereof, to selectively increase the density of the vertical and diagonal linear components thereof, and to maintain the high density of the horizontal linear components thereof.

20. A method of displaying enlarged and thickened, high density dot matrix characters comprised of selected binary data elements representing either a dot or a blank in a matrix of positions arranged in horizontal rows and vertical columns, the method comprising:

(a) storing sets of binary data elements, each set defining a respective character having horizontal linear components of a high density and vertical and diagonal components of a lower density;

(b) defining a reference matrix substantially comprising a subset of the set of stored binary data elements;

(c) expanding the reference matrix by adding blank binary data elements to the defined reference matrix between the binary data elements of the set of stored binary data elements;

(d) comparing selected portions of the expanded reference matrix with corresponding selected portions of a predetermined matrix and converting selected added binary data elements to a dot when the reference matrix matches the predetermined matrix; and (e) selectively using the converted additional binary data elements together with the stored binary data elements to display characters in which the vertical, diagonal and horizontal linear components thereof are lengthened to display a character of enlarged size, selectively thickened in a direction generally orthogonal to the linear direction thereof, and selectively made more dense along the length thereof.

21. The method of claim 20 wherein the step of comparing selected portions of the expanded reference matrix with corresponding selected portions of the predetermined matrix comprises comparing the selected portions of the expanded reference matrix with a predetermined matrix for defining the binary state of the added binary data elements enlarging the character in the vertical direction.

22. The method of claim 20 wherein the step of comparing selected portions of the expanded reference matrix with corresponding selected portions of the predetermined matrix comprises comparing the selected portions of the expanded reference matrix with a predetermined matrix for defining the binary state of the added binary data elements enlarging the character in the horizontal direction and maintaining the high density of the horizontal linear components of the character.

23. The method of claim 20 wherein the step of comparing selected portions of the expanded reference matrix with corresponding selected portions of the predetermined matrix comprises comparing the selected portions of the expanded reference matrix with a predetermind matrix for defining the binary state of the added binary data elements enlarging the character in the horizontal direction.

24. The method of claim 20 wherein the step of comparing selected portions of the expanded reference matrix with corresponding selected portions of the predetermind matrix comprises comparing the selected portions of the expanded reference matrix with a predetermined matrix for defining the binary state of the added binary data elements thickening the character in the horizontal direction.

25. The method of claim 20 wherein the step of comparing selected portions of the expanded reference matrix with corresponding selected portions of the predetermined matrix comprises comparing the selected portions of the expanded reference matrix with a predetermined matrix for defining the binary state of the added binary data elements thickening the character in the vertical direction and increasing the density of the character in the vertical direction.

26. The method of claim 20 wherein the step of comparing selected portions of the expanded reference matrix with corresponding selected portions of the predetermined matrix comprises comparing the selected portions of the expanded reference matrix with a predetermined matrix for defining the binary state of the added binary data elements increasing the density of the diagonal linear components of the character.

27. The method of claim 20 wherein the step of comparing selected portions of the expanded reference matrix with corresponding selected portions of the predetermined matrix comprises comparing the selected portion of the expanded reference matrix with a predetermined matrix for defining the binary state of the added binary data elements eliminating selected consecutive horizontal dots.

28. The method of claim 20 wherein the step of enlarging the reference matrix by adding predetermined blank binary data elements comprises adding predetermined binary data elements to the upper portion of the reference matrix at locations generally below the corresponding binary data element locations representing the stored character, and adding predetermind binary data elements to the upper portion of the reference matrix at locations generally above the corresponding binary data element locations of the base character so that the upper portion of the character is thickened downwardly and the lower portion of the character is thickened upwardly.

29. Apparatus for displaying enlarged and thickened, high density dot matrix characters comprised of selected binary data elements representing either a dot or a blank in a matrix of positions arranged in horizontal rows and vertical columns, the apparatus comprising:
  (a) means for storing sets of binary data elements, each set defining a respective character having horizontal linear components of a high density and vertical and diagonal linear components of a lower density;
  (b) means for defining a reference matrix substantially comprising a subset of the set of stored binary data elements;
  (c) means for expanding the reference matrix by adding blank binary data elements to the defined reference matrix between the binary data elements of the set of stored binary data elements; and
  (d) means for comparing selected portions of the expanded reference matrix with corresponding selected portions of a predetermined matrix and converting selected added binary data elements to a dot when the reference matrix matches the predetermined matrix; and
  (e) means for selectively using the converted additional binary data elements together with the stored binary data elements to display characters in which the vertical, diagonal and horizontal linear components thereof are lengthened to display a character of enlarged size, selectively thickened in a direction generally orthogonal to the linear direction thereof, and selectively made more dense along the length thereof.

30. The apparatus of claim 29 wherein the means for selectively using the generated associated additional binary data elements comprises means for positioning each of the generated binary data elements to thicken the upper portion of the character downwardly and the lower portion of the character upwardly.

31. A method of displaying enlarged and thickened, low density dot matrix characters comprised of selected binary data elements representing either a dot or a blank in a matrix of positions arranged in horizontal rows and vertical columns, the method comprising
  (a) storing sets of binary data elements, each set defining a respective character having horizontal linear components of a high density and vertical and diagonal linear components of a lower density;
  (b) defining a reference matrix substantially comprising a subset of the set of stored binary data elements;
  (c) expanding the referenc matrix by adding blank binary data elements to the defined reference matrix between the binary data elements of the set of stored binary data elements;
  (d) comparing selected portions of the expanded reference matrix with corresponding selected portions of a predetermined matrix and converting selected added binary data elements to a dot when the reference matrix matches the predetermined matrix; and
  (e) selectively using the converted additional binary data elements together with the stored binary data elements to display characters in which the horizontal, diagonal and vertical linear components thereof are lengthened to display a character of enlarged size and thickened in a direction orthogonal to the linear direction thereof while maintaining a uniform density along the length thereof.

32. The method of claim 31 wherein the step of expanding the reference matrix by adding predetermined blank binary data elements comprises adding predetermined binary data elements to the upper portion of the reference matrix at locations generally below the corresponding binary data element locations of the base character, and adding predetermined binary data elements to the upper portion of the reference matrix at locations generally above the corresponding binary data element locations of the base character so that the upper portion of the character is thickened downwardly and the lower portion of the character is thickened upwardly.

33. The method of claim 31 wherein the step of comparing selected portions of the expanded reference matrix with corresponding selected portions of the predetermined matrix comprises comparing the selected portions of the expanded reference matrix with a predetermined matrix for defining the binary state of the added binary data elements enlarging the character in the horizontal direction.

34. The method of claim 31 wherein the step of comparing selected portions of the expanded reference matrix with corresponding selected portions of the predetermined matrix comprises comparing the selected portions of the expanded reference matrix with a predetermined matrix for defining the binary state of the added binary data elements enlarging the character in the vertical direction and thickening the character in the vertical direction.

35. The method of claim 31 wherein the step of comparing selected portions of the expanded reference matrix with corresponding selected portions of the predetermined matrix comprises comparing the selected portions of the expanded reference matrix with a predetermined matrix for defining the binary state of the added binary data elements thickening the character in the horizontal direction.

36. The method of claim 31 wherein the step of comparing selected portions of the expanded reference matrix with corresponding selected portions of the predetermined matrix comprises comparing the selected portions of the expanded reference matrix with a predetermined matrix for defining the binary state of the added binary data elements eliminating overlapping dots.

37. Apparatus for displaying enlarged and thickened, low density dot matrix characters comprised of selected binary data elements representing either a dot or a blank in a matrix of positions arranged in horizontal rows and vertical columns, the apparatus comprising
(a) means for storing sets of binary data elements, each set defining a respective character having horizontal linear components of a high density and vertical and diagonal linear components of a lower density;
(b) means for defining a reference matrix substantially comprising a subset of the set of stored binary data elements;
(c) means for expanding the reference matrix by adding blank binary data elements to the defined reference matrix between the binary data elements of the set of stored binary data elements;
(d) means for comparing selected portions of the expanded reference matrix with corresponding selected portions of a predetermind matrix and converting selected added binary data elements to a dot when the reference matrix matches the predetermined matrix; and
(e) means for selectively using the converted additional binary data elements together with the stored binary data elements to display characters in which the horizontal, diagonal and vertical linear components thereof are lengthened to display a character of enlarged size and thickened in a direction orthogonal to the linear direction thereof while maintaining a uniform density along the length thereof.

38. The apparatus of claim 37 wherein the means for enlarging the reference matrix by adding blank binary data elements comprises means for adding predetermined binary data elements to the upper portion of the reference matrix at locations generally below the corresponding binary data element locations of the base character, and means for adding predetermined binary data elements to the upper portion of the reference matrix at above the corresponding binary data element locations of the base character so that the upper portion of the character is thickened downwardly and the lower portion of the character is thickened upwardly.

39. A method of displaying enlarged, high densitiy dot matrix characters comprised of selected binary data elements representing either a dot or a blank in a matrix of positions arranged in horizontal rows and vertical columns, the method comprising:
(a) storing sets of binary data elements, each set defining a respective character having horizontal linear components of a high density and vertical and horizontal linear components of a lower density;
(b) defining a reference matrix substantially comprising a subset of the set of stored binary data elements;
(c) expanding the reference matrix by adding blank binary data elements to the defined reference matrix between the binary data elements of the set of stored binary data elements;
(d) comparing selected portions of the expanded reference matrix with corresponding selected portions of a predetermined matrix and converting selected added binary data elements to a dot when the reference matrix matches the predetermined matrix; and
(e) selectively using the converted additional binary data elements together with the stored binary data elements to display characters in which the vertical, diagonal and horizontal linear components thereof are lengthened to display a character of enlarged size, and selectively made more dense along the length thereof without thickening the linear components in a direction generally orthogonal to the linear direction thereof.

40. The method of claim 39 wherein the step of comparing selected portions of the expanded reference matrix with corresponding selected portions of the predetermined matrix comprises comparing the selected portions of the expanded reference matrix with a predetermined matrix for defining the binary state of the added binary data elements enlarging the character in the vertical direction.

41. The method of claim 39 wherein the step of comparing selected portions of the expanded reference matrix with corresponding selected portions of the predetermined matrix comprises comparing the selected portions of the expanded reference matrix with a predetermined matrix for defining the binary state of the added binary data elements enlarging the character in the horizontal direction and maintaining the high density of the horizontal linear components of the character.

42. The method of claim 39 wherein the step of comparing selected portions of the expanded reference matrix with corresponding selected portions of the predetermined matrix comprises comparing the selected portions of the expanded reference matrix with a predetermined matrix for defining the binary state of the added binary data elements thickening the character in the vertical direction and increasing the density of the character in the vertical direction.

43. The method of claim 39 wherein the step of comparing selected portions of the expanded reference matrix with corresponding selected portions of the predetermined matrix comprises comparing the selected portions of the expanded reference matrix with a predetermined matrix for defining the binary state of the added binary data elements increasing the density of the diagonal linear components of the character.

44. Apparatus for displaying enlarged, high density dot matrix characters comprised of selected binary data elements representing either a dot or a blank in a matrix of positions arranged in horizontal rows and vertical columns, the apparatus comprising:
  (a) means for storing sets of binary data elements, each set defining a respective character having horizontal linear components of a high density and vertical and diagonal linear components of a lower density;
  (b) means for defining a reference matrix substantially comprising a subset of the set of stored binary data elements;
  (c) means for expanding the reference matrix by adding blank binary data elements to the defined reference matrix between the binary data elements of the set of stored binary data elements;
  (d) means for comparing selected portions of the expanded reference matrix with corresponding selected portions of a predetermined matrix and converting selected added binary data elements to a dot when the reference matrix matches the predetermined matrix; and
  (e) means for selectively using the converted additional binary data elements together with the stored binary data elements to display characters in which the vertical, diagonal and horizontal linear components thereof are lengthened to display a character of enlarged size, and selectively made more dense along the length thereof without thickening the linear components in a direction generally orthogonal to the linear direction thereof.

45. A method of displaying enlarged, low density dot matrix characters comprised of selected binary data elements representing either a dot or a blank in a matrix of positions arranged in horizontal rows and vertical columns, the method comprising
  (a) storing sets of binary data elements, each set defining a respective character having horizontal linear components of a high density and vertical and diagonal linear components of a low density;
  (b) defining a reference matrix substantially comprising a subset of the set of stored binary data elements;
  (c) expanding the reference matrix by adding blank binary data elements to the defined reference matrix between the binary data elements of the set of stored binary data elements;
  (d) comparing selected portions of the expanded reference matrix with corresponding selected portions of a predetermined matrix and converting selected added binary data elements to a dot when the reference matrix matches the predetermined matrix; and
  (e) selectively using the converted additional binary data elements together with the stored binary data elements to display characters in which the vertical, diagonal and horizontal linear components thereof are lengthened to display a character of enlarged size and uniform density along the length of the linear components thereof without increasing the thickness of the linear components in a direction generally orthogonal to the length thereof.

46. The method of claim 45 wherein the step of comparing selected portions of the expanded reference matrix with corresponding selected portions of the predetermined matrix comprises comparing the selected portions of the expanded reference matrix with a predetermined matrix for defining the binary state of the added binary data elements enlarging the character in the horizonal direction.

47. The method of claim 45 wherein the step of comparing the selected portions of the expanded reference matrix with corresponding selected portions of the predetermined matrix comprises comparing the selected portions of the expanded reference matrix with a predetermined matrix for defining the binary state of the added binary data elements enlarging the character in the vertical direction.

48. Apparatus for displaying enlarged, low density dot matrix characters comprised of selected binary data elements representing either a dot or a blank in a matrix of positions arranged in horizontal rows and vertical columns, the apparatus comprising
  (a) means for storing sets of binary data elements, each set defining a respective character having horizontal linear components of a high density and vertical and diagonal linear components of a low density;
  (b) means for defining a reference matrix substantially comprising a subset of the set of stored binary data elements;
  (c) means for expanding the reference matrix by adding blank binary data elements to the defined reference matrix between the binary data elements of the set of stored binary data elements;
  (d) means for comparing selected portions of the expanded reference matrix with corresponding selected portions of a predetermined matrix and converting selected added binary data elements to a dot when the reference matrix matches the predetermined matrix; and
  (e) means for selectively using the converted additional binary data elements together with the stored binary data elements to display characters in which the vertical, diagonal and horizontal linear components thereof are lengthened to display a character of enlarged size and uniform density along the length of the linear components thereof without increasing the thickness of the linear components in a direction generally orthogonal to the length thereof.

49. The method of thickening toward the middle dot matrix characters comprised of a matrix of binary data elements representing either a dot or a blank in a matrix of positions arranged in adjacent horizontal rows, the method comprising
  (a) storing sets of binary data elements, each set defining the shape of a respective character;
  (b) performing logical operations on a set of the stored binary data elements to generate associated additional binary data elements which thicken the respective enlarged character in a direction orthogonal to the linear direction of the horizontal, diagonal and vertical linear components thereof; and
  (c) selectively using the generated associated additional binary data elements together with the stored binary data elements to display enlarged characters in which the upper portion of the character is thickened downwardly and the lower portion of the character is thickened upwardly.

50. The method of claim 49 wherein the step of performing logical operations on a set of the stored binary elements to generate associated additional binary data elements comprises
  (a) defining a reference matrix substantially comprising a subset of the set of stored binary data elements;
  (b) expanding the reference matrix by adding blank binary data elements to the defined reference matrix between the binary data elements of the set of stored binary data elements; and
  (c) comparing selected portions of the expanded reference matrix with corresponding selected portions of a predetermined matrix and converting selected added binary data elements to a dot when the reference matrix matches the predetermined matrix.

51. The method of claim 50 wherein the step of expanding the reference matrix comprises adding binary elements to the upper portion of the enlarged matrix at locations generally below the corresponding binary data element locations representing thre stored character and adding binary data elements to the lower portion of the enlarged matrix at locations generally above the corresponding binary data element locations representing the stored character.

52. The method of claim 50 wherein the step of expanding the reference matrix comprises adding blank binary data elements in matrix locations between the binary data elements of the defined reference matrix, the additional binary data elements and reference matrix together representing the matrix of binary data elements for the desired thickened character.

53. The method of claim 49 wherein the step of storing sets of binary data elements defining the shape of a respective character comprises storing sets of binary data elements having linear components of a high density in a first direction and linear components of a lower density in a second direction orthogonal to said first direction.

54. Apparatus for thickening toward the middle dot matrix characters comprised of a matrix of binary data elements representing either a dot or a blank in a matrix of positions arranged in adjacent horizontal rows, the apparatus comprising
  (a) means for storing sets of binary data elements, each set defining the horizontal, vertical and diagonal components necessary to define the shape of a respective character;
  (b) means for performing logical operations on a set of the stored binary data elements to generate associated additional binary data elements which thicken the respective enlarged character in a direction orthogonal to the linear direction of the horizontal, diagonal and vertical linear components thereof; and
  (c) means for selectively using the generated associated additional binary data elements together with the stored binary data elements to display enlarged characters in which the upper portion of the character is thickened downwardly and the lower portion of the character is thickened upwardly.

55. The apparatus of claim 54 wherein the means for performing logical operations on a set of the stored binary elements to generate associated additional binary data elements comprises
  (a) means for defining a reference matrix substantially comprising a subset of the set of stored binary data elements;
  (b) means for expanding the reference matrix by adding blank binary data elements to the defined reference matrix between the binary data elements of the set of stored binary data elements; and
  (c) means for comparing selected portions of the expanded reference matrix with corresponding selected portions of a predetermined matrix and converting selected added binary data elements to a dot when the reference matrix matches the predetermined matrix.

56. The apparatus of claim 55 wherein the means for expanding the reference matrix comprises means for adding binary elements to the upper portion of the enlarged matrix at locations generally below the corresponding binary data element locations representing the stored character and adding binary data elements to the lower portion of the enlarged matrix at locations generally above the corresponding binary data element locations representing the stored character.

57. The apparatus of claim 55 wherein the means for expanding the reference matrix comprises means for adding blank binary data elements in matrix locations between the binary data elements of the defined reference matrix, the additional binary data elements and reference matrix together representing the matrix of binary data elements for the desired thickened character.

58. The apparatus of claim 54 wherein the means for storing sets of binary data elements defining the shape of a respective character comprises means for storing sets of binary data elements which have a high density in a first direction and a low density in a second direction orthogonal to said first direction.

* * * * *

UNITED STATES PATENT AND TRADEMARK OFFICE
CERTIFICATE OF CORRECTION

PATENT NO. : 4,712,102
DATED : Dec. 8, 1987
INVENTOR(S) : Demetrios Troupes; Randall W. Alexander It is certified that error appears in the above-identified patent and that said Letters Patent is hereby corrected as shown below:

Col. 3, line 59: change "conftrol" to read — control —.
Col. 9, line 57: change "made" to read — mode —.
Col. 10, line 2: change "as" to read — has —.

Col. 11, line 52-53: change "C2,R2b = $A \cdot C + \overline{A} \cdot \overline{C} \cdot [(B \cdot H) \cdot (\overline{G+M}) \cdot (\overline{D+K}) + (G \cdot D) \cdot (\overline{I+H}) \cdot (\overline{B+P})] + A \cdot (G+B)$" to read —

$C2,R2b = A \cdot C + \overline{A} \cdot \overline{C} \cdot [(B \cdot H) \cdot (\overline{G+M}) \cdot (\overline{D+K}) + (G \cdot D) \cdot (\overline{I+H}) \cdot (\overline{B+P})] + A \cdot (G+B)$ — .

Col. 11, line 58-60: change "$C2,Rb = C2 \cdot C2u + \overline{C2} \cdot \overline{C}2u \cdot [(C3 \cdot C1u) \cdot (\overline{C1} + \overline{C}1uu) \cdot (\overline{C3u} + \overline{C}3d) + (\overline{C1} \cdot C3u) \cdot \overline{C}1d + \cdot \overline{C}1u) \cdot \overline{C3} + \overline{C}3uu)] + C2 \cdot (C1+C3)$" to read —

$C2,Rb = C2 \cdot C2u + \overline{C}2 \cdot \overline{C}2u \cdot [(C3 \cdot C1u) \cdot (\overline{C1} + \overline{C}1uu) \cdot (\overline{C3u} + \overline{C}3d) + (C1 \cdot C3u) \cdot (\overline{C}1d + \overline{C}1u) \cdot (\overline{C3} + \overline{C}3uu)] + C2 \cdot (C1+C3)$ Col. 12, lines 10, 11 and 12: change "$C2,Rb = C2 \cdot C2u + (\overline{C}2 \cdot \overline{C}2u) \cdot [(C3 \cdot C1u) \cdot (\overline{C1} + \overline{C}1uu) \cdot (\overline{C3u} + \overline{C}3d) + (C1 \cdot C3u) \cdot (\overline{C}1d + C1u) \cdot (\overline{C3} + \overline{C}3uu)] + (C2 \cdot (C2 \cdot (C1+C3))u$" to read —

$C2,Rb = C2 \cdot C2u + (\overline{C}2 \cdot \overline{C}2u) \cdot [(C3 \cdot C1u) \cdot (\overline{C1} + \overline{C}1uu) \cdot (\overline{C3u} + \overline{C}3d) + (C1 \cdot C3u) \cdot (\overline{C}1d + \overline{C}1u) \cdot (\overline{C3} + \overline{C}3uu)] + (C2 \cdot (C1+C3))u$ — .

UNITED STATES PATENT AND TRADEMARK OFFICE
CERTIFICATE OF CORRECTION

PATENT NO. : 4,712,102

DATED : Dec. 8, 1987

INVENTOR(S) : Demetrios Troupes; Randall W. Alexander

It is certified that error appears in the above-identified patent and that said Letters Patent is hereby corrected as shown below:

Col. 12, line 25: change "$(\overline{yu}+\overline{yd}) + w \cdot yu) \cdot (\overline{wd}+\overline{wu})$." to read —

$(\overline{yu}+\overline{yd}) + (w \cdot yu) \cdot (\overline{wd}+\overline{wu})$. — .

Col. 12, line 43: change "$C'(i)=C(i)+C(i=1)$" to read — $C'(i)=C(i)+C(i-1)$ — .

Col. 15, line 13: change "numered" to read — numbered — .

Col. 15, lines 51-53: $C2,Rb=C2 \cdot C2u+(\overline{C2} \cdot \overline{C2u}) \cdot ((C3 \cdot C1u)) \cdot (\overline{C}\cdot 1+\overline{C}1uu) \cdot (\overline{C}3u+\overline{C}3d)+(C1 \cdot C3u) \cdot (\overline{C}1d+ \cdot \overline{C}1u) \cdot (\overline{C}3+\overline{C}3uu))$" to read —

$C2,Rb=C2 \cdot C2u+(\overline{C2} \cdot \overline{C2u}) \cdot ((C3 \cdot C1u)) \cdot (\overline{C1}+\overline{C}1uu) \cdot (\overline{C}3u+\overline{C}3d) + (C1 \cdot C3u) \cdot (\overline{C}1d+\overline{C}1u) \cdot (\overline{C}3+\overline{C}3uu))$ — .

Col. 16, line 25: change "colulmn" to read — column — .

Col. 18, line 33: change "colulmn" to read — column — .

Col. 18, line 58: change "colulmn" to read — column — .

Col. 18, lines 63-64: change "$C2b,R2a=B \cdot H \cdot \overline{A} \cdot \overline{C} \cdot (\overline{G}+\overline{M}) \cdot (\overline{K}+\overline{D} \cdot )+A \cdot F \cdot \overline{B} \cdot \overline{D} \cdot (\overline{J}+\overline{C}) \cdot (\overline{E}+\overline{Q})$" to read —

$C2b,R2a = B \cdot H \cdot \overline{A} \cdot \overline{C} \cdot (\overline{G}+\overline{M}) \cdot (\overline{K}+\overline{D})+A \cdot F \cdot \overline{B} \cdot \overline{D} \cdot (\overline{J}+\overline{C}) \cdot (\overline{E}+\overline{Q})$ — .

UNITED STATES PATENT AND TRADEMARK OFFICE
CERTIFICATE OF CORRECTION

PATENT NO. : 4,712,102

DATED : Dec. 8, 1987

INVENTOR(S) : Demetrios Troupes; Randall W. Alexander

It is certified that error appears in the above-identified patent and that said Letters Patent is hereby corrected as shown below:

Col. 19, lines 12-13: change "$C2b, R2c = G \cdot D \cdot \overline{A} \cdot \overline{C} \cdot (\overline{I} + \overline{H}) \cdot (\overline{B} + P)$ $+ C \cdot E \cdot \overline{B} \cdot \overline{D} \cdot (\overline{A} + \overline{N}) \cdot (\overline{L} + \overline{F})$" to read —

$C2b, R2c = G \cdot D \cdot \overline{A} \cdot \overline{C} \cdot (\overline{I} + \overline{H}) \cdot (\overline{B} + \overline{P})$ $+ C \cdot E \cdot \overline{B} \cdot \overline{D} \cdot (\overline{A} + \overline{N}) \cdot (\overline{L} + \overline{F})$ — .

Col. 19, line 58: change "$C2c, Ra = C2u \cdot C3 \cdot C2 \cdot C3u$" to read —

$C2c, Ra = C2u \cdot C3 \cdot \overline{C2} \cdot \overline{C3}u$ — .

Col. 20, line 51: change "$C''(i)b = \overline{C''(i)}a \cdot C'(i)b$" to read —

$C''(i)b = \overline{C''(i)a} \cdot C'(i)b$ — .

Col. 25, line 67: after thereof, delete "the" and insert — to — .

Col. 35, line 39: change "thre" to — the — .

Signed and Sealed this

Nineteenth Day of July, 1988

*Attest:*

DONALD J. QUIGG

*Attesting Officer*  *Commissioner of Patents and Trademarks*